United States Patent [19]

Cooper

[11] 3,927,404

[45] Dec. 16, 1975

[54] TIME DIVISION MULTIPLE ACCESS COMMUNICATION SYSTEM FOR STATUS MONITORING

[75] Inventor: Glenn F. Cooper, West Springfield, Mass.

[73] Assignee: Standard Electric Time Corporation, Springfield, Mass.

[22] Filed: Oct. 18, 1973

[21] Appl. No.: 407,660

[52] U.S. Cl. ................ 340/413; 340/408; 340/409; 328/59

[51] Int. Cl.[2] ...................... G08B 19/00; H04Q 3/00

[58] Field of Search......... 340/413, 152 R, 150, 408

[56] References Cited

UNITED STATES PATENTS

| | | | |
|---|---|---|---|
| 3,021,508 | 2/1962 | White | 340/147 F |
| 3,214,734 | 10/1965 | Whitehead | 340/408 |
| 3,482,243 | 12/1969 | Buchsbaum | 340/408 |
| 3,508,260 | 4/1970 | Stein | 340/408 |
| 3,611,361 | 10/1971 | Gallichotte | 340/150 |
| 3,613,092 | 10/1971 | Schumann | 340/150 |
| 3,713,142 | 1/1973 | Getchell | 340/408 |
| 3,735,396 | 5/1973 | Getchell | 340/413 |

*Primary Examiner*—Thomas B. Habecker
*Attorney, Agent, or Firm*—Johnson, Dienner, Emrich & Wagner

[57] ABSTRACT

A communication system wherein data at a plurality of different zones is transmitted to a control panel at a central location over a common communication line including an address pulse generator at the central location which transmits a programmed number of address pulses over the communication line to effect sequential enabling of zone status monitors at each of the zones, each of which obtains power from the address pulses, and provides frequency signals representing a normal or off-normal condition for a variable for transmission over the communication line to the central location, and a receiver at the central location which decodes and processes the responses. A number of zone status monitors may be divided into groups with each group transmitting data to a central location over an area address pulse generator which is connected to the communication line, or multiple communication lines may be monitored from a master control panel through the use of slave control panels.

57 Claims, 43 Drawing Figures

TIME DIVISION MULTIPLE ACCESS COMMUNICATION SYSTEM FOR STATUS MONITORING

BACKGROUND OF THE INVENTION

1. Field of the Invention

This invention relates to communication systems, and more particularly to a multiplexed data transmission system for communicating the status of several monitored variables in each of many remote locations to a central location over a common transmission line.

2. Description of the Prior Art

Many types of zoned data readout systems have been proposed in the prior art for permitting the transmission of data from a plurality of remote data points in different zones of the system to a central location. The data may, for example, represent alarm indications, such as the detection of fire or the intrusions of an unauthorized person in a security alarm system, a fault condition of a circuit or apparatus in a maintenance monitoring system or any other type of data. Generally, each zone includes a transponder unit which is responsive to interrogate signals, transmitted via a communication line to the location of the transponder, to provide reply data signals representing data provided at such location. In most cases, a power source must be provided for the transponders at the remote locations to enable reply data signals to be generated.

In some of these systems, a separate wire pair is connected between each reporting zone and a central monitor. However, the provision of a separate communication link between each zone and the central monitoring location becomes expensive when a large number of zones are to be monitored or when the distance between such zones and the central location is great.

Accordingly, multiplexing or coded frequency techniques are sometimes employed to permit data provided at a plurality of zones to be transmitted to a central location over a common communication line which interconnects the zones with a control panel at a central location, thereby minimizing the amount of conductors required for the system. However, in some instances, there may be interference between responses provided by different zones when the conditions of variables at one or more of the zones change state at the same time. In addition, there are generally limits on the number of zones which can have data transmitted over a common communication line and on the separation between the central monitor and the farthest zone.

Certain systems have circumvented the interference problem by employing two wires for data transmission and additional wires for control purposes. Alternatively, interference between data provided by various zones employing a common transmission link has also been minimized by the use of analog measurement at the control panel of several degrees of change in voltage, impedance, and time delay or etc. to permit identification of the zone providing the data. However, in such cases, a very limited number of zones can have data transmitted over a given conductor pair.

In the case of alarm transmission, for example, motor driven code wheel transmitters or the like are frequently employed. However, electromechanical coding mechanisms transmit a change of state only three or four times, whether correctly received or not at the control panel. In addition, such arrangements are limited to one monitored variable per code transmitter.

Frequently systems employ techniques which result in the lack of capability of transmitting the states of the variables in all of the zones continually. Still other systems are dependent upon processing by a minicomputer which is seldom fully and efficiently utilized and which may be periodically unavailable to the communication system when used for certain other tasks.

A further shortcoming of some prior art communications systems is that such systems are dependent upon one way transmission on a coaxial cable over a loop including all the reporting zones. Thus, in the event of an open-circuit in the coaxial cable, data transmission is interrupted. In addition, such systems would generally require a modem to employ voice grade telephone lines in the system. Thus, in protective signaling systems, there exists a need for Class A operation on a closed loop wherein even should the continuity of one wire be interrupted at any point, two way communication between the reporting zones and the central monitor can still be maintained.

In addition, in those known systems wherein the continuity of wiring is tested, the location of a fault is not defined more finally than the whole length of two wires.

SUMMARY OF THE INVENTION

It is an object of the present invention to provide an economical and reliable system for communicating to central locations the status of several monitored variables in each of many remote locations, or zones and without the need for local main or standby power in each zone.

It is a further object of the present invention to provide a communication system for effecting the readout of the status of several monitored variables in each of a plurality of zones over a common transmission line without the possibility of interference between zones even when monitored variables in one or more of the zones change state simultaneously.

Another object of the invention is to provide a communication system for monitoring the status of several variables at a remote location or zone wherein priorities are assigned to each variable to permit the variable of the highest priority to have its status transmitted in the event that more than one monitored variable in a given zone is off-normal simultaneously. In addition, the status of the highest priority off-normal variable will be transmitted continually until its monitor is reset, and thereafter the status of the next highest priority variable, if any, which is off-normal, will be transmitted.

Another object of the invention is to transmit a change of state of a monitored variable by means of a response frequency change and to transmit a change of state of one of a group of higher priority monitor variables by means of a change from a response frequency in a lower priority group to a response frequency in a higher priority group.

Another object is to process the frequency signals representing the status of one of a plurality of monitored variables in a given zone so as to prevent the possibility of ambiguity among the monitored variables and to provide an output indicating transmission error in the case of apparent ambiguity.

It is yet another object of the invention to provide a communication system wherein signals are transmitted and received simultaneously over more than one path, as in a continuous loop, without interference due to reflections or delay differences.

It is a further object of the invention for monitoring the status of a plurality of zones wherein indications of malfunctions of zone status monitors or open-wire conditions of a communication line connected between the zone status monitors and a control location is continually monitored, and wherein the location of an open-wire condition in the communication line can be defined within a fraction of the length of the communication line.

These and other objects are achieved by the present invention which has provided a communication system for transmitting data representing the status of a plurality of variables at each of a plurality of remote locations or zones to a central location over a common communication line.

In one embodiment, a zone status monitoring means provided at each zone is operable when enabled to generate response signals corresponding to the state of initiating devices in the zone according to fixed priorities.

The responses provided by the zone status monitoring means at each of the zones are transmitted to a control panel at the central location over a communication line which extends between the control panel and the locations of all of the zone status monitoring means. In accordance with the invention, the communication line may comprise a Class A loop which permits two-way transmission of data on a single line on a closed loop wherein even should the continuity of one wire of the transmission line be interrupted at any point, two-way communication with any zone may still be maintained through one remaining portion or the other of the wire.

An address pulse generator means at the control panel generates address pulses for transmission over the communication line to the locations of the zone status monitoring means for effecting read-out of the information provided by the zone status monitoring means. The address pulse generator means transmits a programmed number of address pulses during each time frame, the end of each address pulse defining the start of a time slot and the number of address pulses defining the number of time slots in a given frame.

The address pulse generator means includes time slot rate generator means which generates output pulses at a predetermined rate, power amplifier means for amplifying pulses extended thereto from the output of the time slot rate generator means for providing power address pulses for transmission over the transmission line to the locations of the zone status monitoring means. The address pulse generator means further includes gating means operable when enabled to gate a predetermined number of the pulses provided by said time slot rate generating means to said power amplifier means and means responsive to the pulse output of said time slot rate generator means to enable said gating means to gate a programmed number of pulses to said power amplifier means. The first power address pulse is used to effect energization of all of the zone status monitoring means connected to the communication line. In addition, a wire continuity testing means of the address pulse generator means is energized at the time the first power address pulse is provided to test the continuity of the communication line, providing a first indication whenever there is continuity in the communication line and a second indication in the event of an open circuit condition in the communication line. Thereafter, further power address pulses, corresponding in number to the number of zone status monitoring means, are provided to effect sequential read-out of the information provided by each of the zone status monitoring means.

Each zone status monitoring means includes counter means, decoder means, response generator means, and power circuit means. The power circuit means obtains power from the address pulses and provides an energizing potential for the counter means which then counts the address pulses transmitted over the transmission line. The decoding means enables the response generator means by decoding the corresponding state of the associated counter means to permit the response generator means to be energized for the duration of one time slot to generate a response frequency at one of "N" frequencies F1–FN under the control of an initiating means. The decoding means is programmed to select any one of the time slots and different zone status monitoring means are programmed to decode a different time slot. Each initiating means includes a plurality of internal and/or remote switch contacts, each representing a different monitored variable. A first response frequency F1 may represent a normal condition for all of the monitored variables. Further response frequencies F2–FN may each represent an off-normal condition for a different one of the monitored variables. The response frequencies are generated according to assigned priorities and transmitted over the communication line to the control panel at the central location.

The response signals provided by all of the zone status monitoring means are received by the address pulse generator means at the control panel and extended to a receiver means which decodes, processes and separates the response frequencies provided by each of the zone status monitoring means.

The receiver means includes frequency detecting means including an individual frequency detector circuit for each of the frequencies F1–FN which separates the response signals provided by the zone status monitoring means at each zone into pulses on as many output lines as there are monitored variables, plus additional lines representing normal response, lack of response, and time slot timing. The receiver means further includes exclusivity and timing logic means which processes the outputs of the frequency detecting means to insure that only one of the response frequencies is being transmitted during a given time slot and to output a trouble indication whenever no response frequency is received during a given time slot.

Thus, the receiver receives the response signal provided by each zone status monitoring means, determines the frequency of the response signal provided by each zone status monitoring means and identifies each response exclusively. The receiver means provides outputs corresponding to each zone response as it is received and extends such outputs to suitable recording and display means for indicating the status of the monitored variables for each of the reporting zones.

In accordance with a second embodiment of a communication system provided by the present invention, a plurality of zone status monitoring means may be divided into groups, each group communicating with the common communication line over an associated area control panel which includes an area address pulse generating means. The area address pulse generating means counts out a pre-programmed block of time slots of those created by the address pulse generating means of the control panel at the central location, and furnishes address pulses on an area line common to its group of associated zone status monitoring means. The responses provided by the zone status monitoring means of a given group are relayed to the common line over the area address pulse generating means. The use of area address pulse generating means in accordance with the second embodiment of the invention permits the system to be extended in distance and/or number of zones in comparison with the system of the first embodiment.

In yet another embodiment, which provides further extension of the size of the system, multiple control panels each control one or more area address pulse generating means and/or zone status monitoring means over a local communication line while the control panels in turn communicate with one another over a common communication line.

Each of the control panels includes an address pulse generator which furnishes address pulses to associated local zone status monitoring means. One of the control panels, which serves as a master control panel, furnishes a synchronizing carrier which is transmitted over the common communication line to the slave control panels to establish the time slot rate for all of the address pulse generators connected to the common line, either directly or over a slave control panel.

Each slave address pulse generating means is responsive to the synchronizing signal to generate address pulses during pre-programmed time slots, and furnish address pulses to associated area address pulse generating means and/or zone status monitoring means to effect the generation of responses. The slave address pulse generating means also relays the status responses provided by associated area address pulse generating means and zone status monitoring means onto the common line such that all of the status responses will be made available to receivers located at any of the master or slave control panels or additionally, to a receiver at a remote display which may not have any zone status responses to send out. Either a master or a slave control panel may have either a receiver or local zone status monitoring means or both. Thus, there is a complete two-way exchange of status information among all of the control panels, any one of which may be a master, and additional transmission from the group to a passive, remote monitor is also provided for in contrast to one-way transmission to a single control panel.

DESCRIPTION OF THE DRAWINGS

FIGS. 6–9 are to be arranged;

FIGS. 10 and 11 are to be arranged; and

FIGS. 12–15 are to be arranged.

DESCRIPTION OF PREFERRED EMBODIMENTS

GENERAL DESCRIPTION

Figure 1:
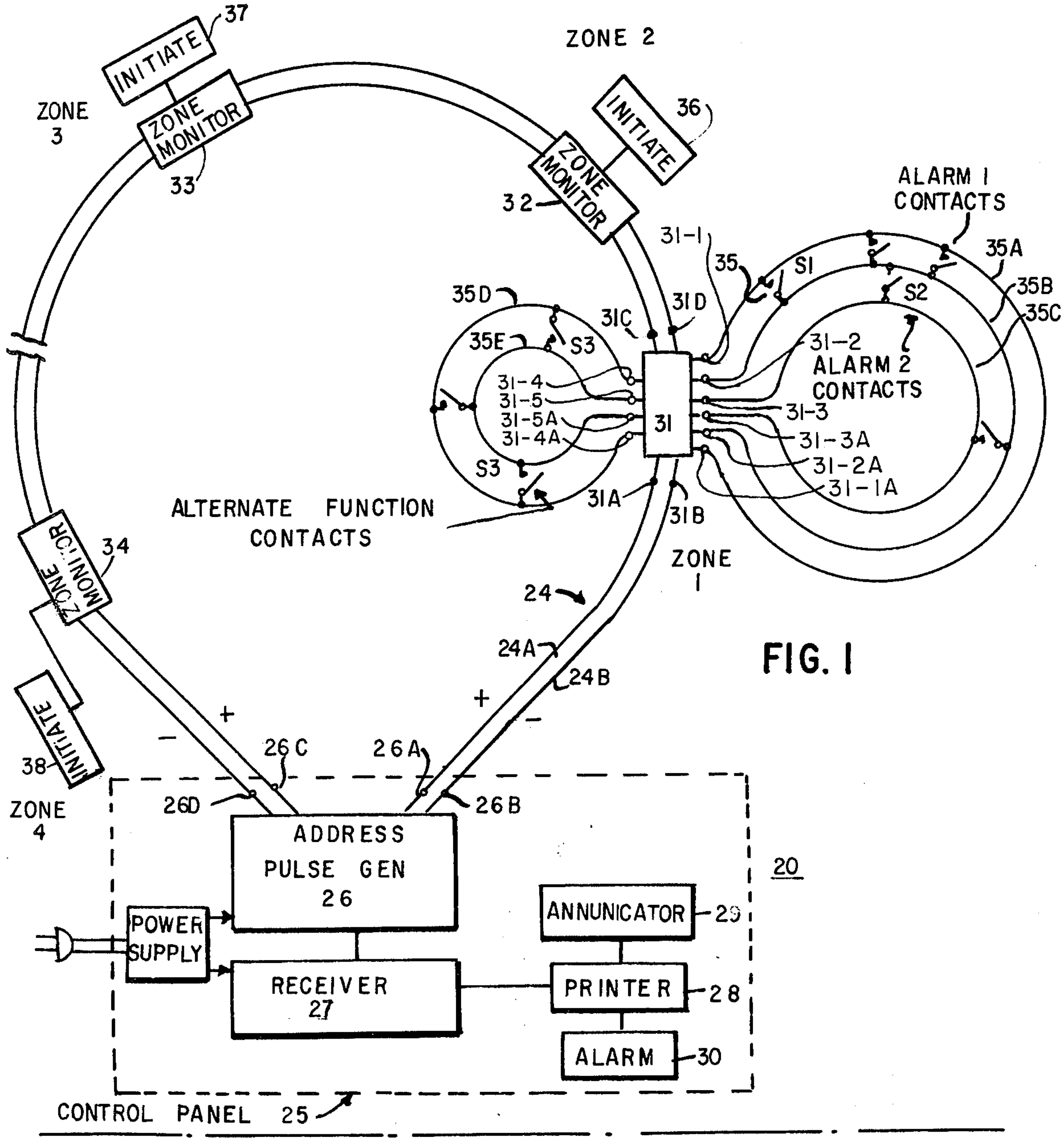
FIG. 1 is a block diagram representation of a first embodiment of a communication system provided by the present invention.

Referring to FIG. 1, there is shown a block diagram of a first embodiment of a time-division multiple access communication system 20 provided by the present invention. The system 20 permits data provided at a plurality of zones to be transmitted over a common transmission line to a control panel or console 25 at a central location. In the exemplary embodiment, data provided at 30 zones, including zones 1, 2, 3, 4 shown in FIG. 1, may be monitored from the control panel 25.

By way of illustration, the time-division multiple access communication system provided by the present invention may be employed in protective signaling systems, such as a fire alarm system. The system is especially suited to reporting conditions in office buildings or in groups of buildings which may be considerable distances apart. In addition, each building may have a large number of zones and multiple functions may be reported by a given zone. The system 20 provides for the transmission of zoned information from a plurality of zones without interference between the response signals provided by different zones and without the need for a prohibitive number of wires for the communication link. The communication system 20 of the present invention may be operable as a two-wire Class A or Class B system capable of working on building wiring and voice grade telephone lines, for example.

To permit transmission of data in a positive non-interfering successive manner, a separate zone status monitor or zone transmitter is provided for each zone, such as zone status monitors 31–34 located in zones 1–4, respectively, as shown in FIG. 1. Each of the zone status monitors 31–34 has a different preassigned address and is responsive to address pulses generated by an address pulse generator 26 at the control panel 25 and transmitted over the transmission line 24 to provide response signals indicating information provided at the corresponding zone. It is pointed out that the zone status monitors receive power from the address pulses and thus a separate power supply is not required for the zone status monitors.

In the embodiment illustrated in FIG. 1, which is a Class A system, the zone status monitors 31–34 are connected across the transmission line 24 which includes a pair of conductors 24A and 24B which extend in a closed loop initiating at terminals 26A and 26B of the address pulse generator and terminating at terminals 26C and 26D of the address pulse generator 26.

Thus, even if the continuity of one of the wires 24A or 24B should be interrupted at any point, two-way communication with any zone status monitor may still be maintained through one of the remaining portions of the wire. The system 20 is nearly as free from turn around delay as a one-way loop system and even if a loop should be interrupted near either end, the time delay of the loop would never be a limiting factor in the operation of the system.

The system 20 may also be connected for Class B operation, in which case the zone status monitors 31–34 are connected across the two conductor transmission line 24. For Class B operation, the transmission line is connected at one end to terminal 26A and 26B of the address pulse generator 26 and terminates at the farthest zone status monitor, such as zone status monitor 34. No end of line resistance is required for Class B operation because the zone status monitors are continually scanned for normal response. Thus, an open wire condition is indicated and located by the lack of response of one or more zone status monitors as hereinafter described.

Each zone status monitor has an associated initiating circuit such as initiating circuit 35 for zone status monitor 31 which may include a plurality of internal and/or remote switch contacts, such as contacts S1–S3 for representing the status of the monitored variables. While in the exemplary embodiment only three variables are monitored by a given zone status monitor, it is to be understood that a greater number of variables could be monitored by providing additional contacts, or other data output devices. In the embodiment shown in FIG. 1, which represents a Class A system, a pair of conductors connect each set of contacts to individual inputs of the zone status monitor 31. For example, contacts S1 are connected across a pair of conductors 35A and 35B which have first ends connected to terminal 31-1 and 32-2, respectively, of zone status monitor 31, and second ends connected to terminals 31-1A and 31-2A, respectively, of the zone status monitor 31. Contacts S2 are connected across a pair of conductors 35B and 35C which extend between terminals 31-2 and 31-2A and 31-3, 31-3A, respectively, of the zone status monitor 31. The other contacts S2 are connected across a further pair of conductors 35D and 35E which extend between terminals 31-4, 31-4A and 31-5, 31-5A, respectively.

Thus, it is apparent that for the initiate circuit 35, shown in FIG. 1, which is operable in a Class A mode, both ends of the conductors 35A–35C terminate at terminals of the zone status monitor circuit 31.

For Class A operation, a desirable maximum resistance for the initiating circuit may be on the order of 100 ohms. The contacts S1–S2 and S3 are preferably normally open contacts having a maximum contact resistance of 100 ohms for a 2.5 milliamp initiating line current.

Alternatively, for Class B operation of the initiating circuit 35, each conductor pair, such as conductors 35A and 35B extend from terminals such as terminals 31-1 and 31-2, respectively, of the zone status monitor 31, and terminate in an end-of-line resistor. The end-of-line resistor may, for example, have a value of approximately 1200 ohms.

In accordance with an illustrative embodiment, wherein the communication system 20 of the present invention is employed in a protective fire alarm signaling system, the status of contacts S1 and S2 at each zone may indicate the conditions of alarm initiating devices such as manual stations, heat or smoke detectors, etc., in the corresponding zone. In addition, contact S3 may represent the status of non-alarm initiating devices or an alternate function for such zones. Such non-alarm initiating devices may include sprinklers, supervisory switches, or the like. In addition, in a pre-signal alarm system, contacts S1 and S2 may provide general and pre-signal alarms, respectively, for the corresponding zone. The pre-signal alarm indication would be provided as the result of closure of switch contacts S2 by associated heat or smoke detectors or operating a switch at a manual station. The general alarm indication is initiated by an authorized person using a key-operated switch within the manual station to close contacts S1. The two-alarm indication functions provided by the zone status monitors may be used in a pre-signal system alternatively for other combinations, such as distinguishing manual alarms from automatic detectors or fire alarms from water flow alarms, thus advantageously eliminating the need for separate zone status monitors for each function. Both the amount of hardware and the number of zones to be scanned may be economized in this manner.

When zone status monitor 31 is enabled by address pulses provided by the address pulse generator 26, the switch contacts such as contacts S1–S3, which indicate the status of the monitored variables, general alarm, pre-signal alarm and alternate function, respectively, are interrogated and a response frequency, which may be an audio signal at one out of four frequencies F1–F4 in the present example, is generated. The response frequency is applied to the transmission line 24 during a preassigned time slot for transmission to the address pulse generator 26 at the control panel 25.

The responses transmitted by all of the zone status monitors are received by the address pulse generator 26 and extended to a receiver 27. The receiver 27 detects the frequency of the response signal of the addressed zone status monitor, identifies the response exclusively, that is, determines which of the four response frequencies F1–F4 is being transmitted, and processes the responses provided by the zone status monitors to indicate normal or off-normal conditions for variables in each zone. The receiver 27 generates a transmission error signal whenever any one of the zones lacks a verified response and generates a trouble signal whenever a transmission error is provided by one or more zones for a predetermined number of successive interrogation cycles.

The control panel may include a printer unit 28 which is responsive to outputs of the receiver 27 to demultiplex and store the data representing the zone responses and to print a record of alarms, trouble conditions, acknowledgements and restorations in an alpha-numeric form.

The printer 28 also controls an annunciator 29 which may include a plurality of indicator lamps (not shown) which provide continuous display of zone alarms or other states as may be desired for each of the zones. The annunciator 29 may also provide for distinguishing between new alarms as opposed to acknowledged alarms and may indicate return to normal conditions for the various zones.

An audible alarm unit 30 which is also controlled by the printer 28 may be employed to provide an audible alarm in the event of an alarm indication by one or more zones. The audible alarm unit may also provide a further audible alarm to indicate return to normal conditions for the alarm initiating apparatus at the zones.

ADDRESS PULSE GENERATOR

Figure 2:
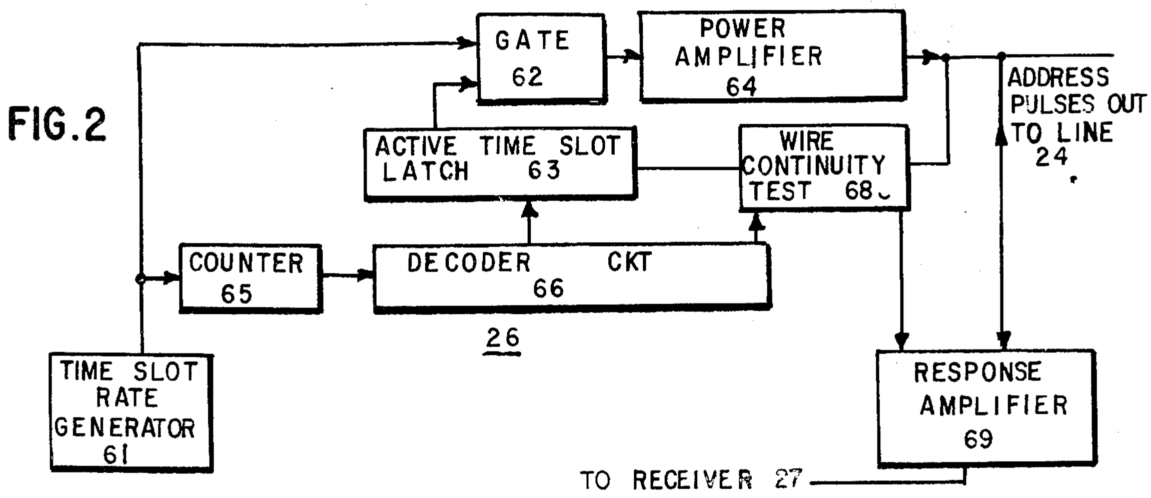
FIG. 2 is a block diagram of an address pulse generator employed in the system shown in FIG. 1.

A block diagram of the address pulse generator 26 is shown in FIG. 2. The address pulse generator 26 includes a time slot rate generator 61, embodied as a free running oscillator, which generates an output signal at a predetermined frequency which in the exemplary embodiment, is 51.6 $H_z$.

The output of the oscillator 61 is extended to an input of a gate circuit 62 which has a further input connected to the output of a latch circuit 63. The output of the gate circuit 62 is connected to an input of a power amplifier and shaper circuit 64.

Gate 62 is enabled to pass the signal output of the oscillator 61 to the signal amplifier and shaper circuit 64 whenever the latch circuit 63 is set. The signal amplifier and shaper circuit 64 amplifies the signal output of the oscillator and provides power address pulses which are extended to the transmission line 24 for transmission to the zone status monitors connected thereto.

The state of the latch circuit 63 is controlled by a counter 65 and a decoder circuit 66 to enable the gate circuit 62 to pass a programmed number of pulses, which define a frame or an interrogate cycle, provided by the free-running oscillator to the signal amplifier and shaping circuit 64 and thence to the transmission line 24. The counter 65 is connected to the output of the oscillator 61 and continuously counts the frequency output of the oscillator 61. When the counter 65 reaches a first predetermined count, the decoder circuit 66 is enabled to provide an output for setting the latch circuit 63, thereby enabling gate 62 and permitting address pulses to be extended to the transmission line. Thereafter, when the counter 65 reaches a second predetermined count, the decoder circuit 66 effects reset of the latch circuit 63, inhibiting gate 62 and precluding the transmission of further address pulses until the counter 65 again reaches the first count.

Figure 2A:
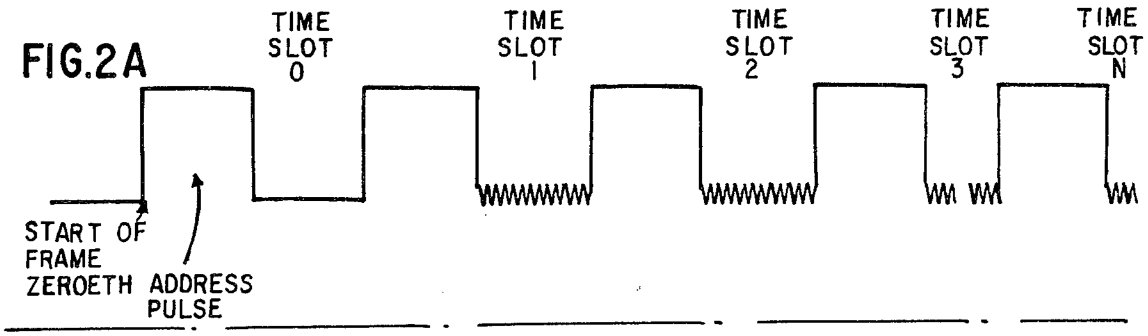
FIG. 2A illustrates the wave form for signals transmitted over the communication line of the system shown in FIG. 1 during an interrogation cycle.

The decoder 66 is programmable to permit transmission of a predetermined number N + 1 address pulses 60 shown in FIG. 2A which illustrates the waveform for signals transmitted over the transmission line 24. The zeroeth address pulse of each frame is used to effect energization of the zone status monitors and address pulses 1–N are each effective to enable a different one of the zone status monitors to provide a responsive signal.

The time between the zeroeth and the first address pulses of each frame defines the zeroeth time slot at which time the continuity of the transmission line 24 is checked. The times between consecutive ones of the remaining address pulses define time slots 1–N at which times the zone status monitors provide response signals. For example, zone status monitor 31 provides a response during time slot 1. Zone status monitors 32–34 provide responses during time slots 2–4, respectively. The manner in which the zone status monitors 31–34 are individually enabled to provide response signals during assigned line slots 1–4, respectively, will be described in detail hereinafter.

While in the present example it is assumed thirty zones are being monitored, an eight bit counter 65 is used to permit providing a count of 256. However, in the exemplary embodiment, the decoder circuit 66 is enabled when the counter 65 reaches a count of zero to set the latch circuit 63 and is enabled when the counter 65 reaches a count of thirty to reset the latch circuit, thus permitting thirty-one address pulses to be transmitted to the zone status monitors. The counter 65 will continue to count the pulses provided by the oscillator 61 and when the counter 65 counts 255 pulses and thereafter reaches a count of zero with the next oscillator pulse; the decoder circuit 66 will again be enabled to pass a second block of pulses to the transmission line 24.

It is apparent that the number of zones which can be monitored is dependent upon the particular counter used and the programming of the decoder circuits 66, and in the present example, the address pulse generator 26 may provide address pulses for effecting readout of 250 zones which because of fire codes is the maximum allowable number of reporting zones that may be controlled from a single control panel. However, it is to be understood that such limitation is characteristic to fire alarm systems and that a greater number of reporting stations may be controlled from a single control panel when the communication system is employed in other data recovery applications.

As indicated above, the continuity of the transmission line 24 is tested during the zeroeth time slot of each frame. The address pulse generator 26 includes a wire continuity supervisory circuit 68 which supervises the continuity of the local line 24. The transmission line continuity test is provided during the zeroeth time slot after the zeroeth power pulse has terminated. At such time, none of the zone status monitors are providing a response, as indicated in FIG. 2A.

During the zeroeth time slot, the wire continuity supervisory circuit is enabled by the decoder circuit 66 to supply supervisory current to the loop 24. If the loop 24 is continuous, the supervisory current enables a response oscillator 128 of the address pulse generator 26 to generate a response signal at frequency F1 which is extended to the receiver 27. If a lack of continuity exists in the loop 24, the response amplifier 69 is inhibited and the absence of the response signal during the first time slot is processed through the receiver 27 as an indication of trouble in the transmission loop 24.

During the remaining time slots 1–30 in the exemplary embodiment, as address pulses are extended over gate 62 and the power amplifier circuit 64 to the transmission line 24, successively different zone status monitors, including zone status monitors 31–34, are energized and the response signals from such zones are transmitted over the local loop 24 as shown in FIG. 2A and extended over the response amplifier 69 to the receiver 27. When the last address of a given frame is applied to the local line 24, the decoder circuit 66 resets the latch circuit 63 thereby disabling gate 62 to inhibit transmission of further address pulses. The counter, however, continues to cycle under the control of the oscillator 61 and when the counter 65 resets to zero as the result of further pulses provided by the oscillator 61, the decoder circuit 66 is again enabled to set the latch circuit 63 enabling gate 62 to permit a second frame of address pulses to be transmitted, thereby effecting a second readout cycle for the zone status monitors.

ZONE STATUS MONITOR

Figure 3:
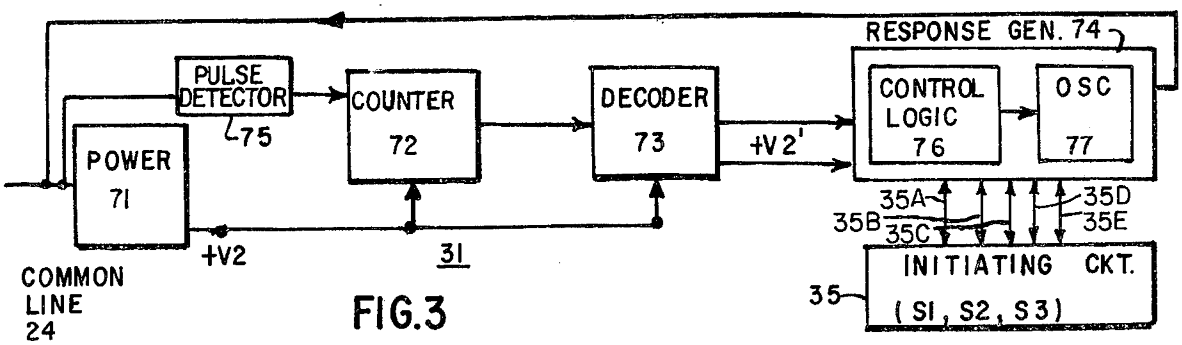
FIG. 3 is a block diagram of a zone status monitor circuit for use in the system shown in FIG. 1.

Each of the zone status monitors, 31–34 such as zone status monitor 31 shown in block diagram form in FIG. 3, includes a power circuit 71, a pulse detector 75, a counter 72, a preprogrammed decoder 73, and a response generator circuit 74. As indicated above, the zone status monitor circuit 31 obtains power from the address pulses which are transmitted over the transmission line 24. With the receipt of the first address power pulse of each frame, the power circuit 71 is enabled to provide an energizing voltage +V2 which is extended to the pulse detector 75, the counter 72, the decoder 73 and the response generator 74. Thereafter, further successive address pulses in the same frame maintain the power circuit 71 energized.

The pulse detector 75 may comprise a monostable circuit which is triggered by each address pulse to provide an output pulse of a preselected duration for the counter circuit 72.

The counter 72 is operable when energized to count the address pulses received over the transmission line 24 and pulse detector 75 and to enable the decoder circuit 73 when the number of pulses counted reaches the count corresponding to the address assigned to zone status monitor 31.

The decoder circuit 73 is operable when enabled to extend the energizing voltage +V2′ to the response generator 74 which is then energized to provide a response signal which indicates the status of the switch contacts S1, S2, S3 of the initiating circuit 35 associated with zone status monitor 31.

The response generator 74 includes control logic circuits 76 and a multifrequency oscillator circuit 77 which is controlled by the control logic circuits 76. The control logic circuits 76 are connected over terminals 31-1 to 31-5 and 31-1A to 31-5A to the contacts S1, S2 and S3 of the initiating circuit 35 over conductors 35A–35F as shown in FIG. 1.

Under normal conditions, that is when all of the contacts S1, S2, and S3 are open, the logic circuits 76 enable the oscillator 77 to provide a response signal at a frequency F1 which in the exemplary embodiment is 2140Hz. Whenever alarm contacts S1 are closed indicating an alarm 1 condition, the logic circuits 76 control the oscillator 77 to provide a response signal at a frequency F4, which is 2900Hz in the present example. If alarm contacts S2 are closed indicating an alarm 2 condition, the control logic 76 controls the oscillator 77 to provide a response signal at a frequency F3, which is 2640Hz. Moreover, if the alternate function contacts S3 are closed, the oscillator 77 provides a response signal at a frequency F2 which is 2310Hz. In addition, whenever there is a discontinuity in one or more of the conductors 35A–35E of the initiate circuit 35, the logic circuits 76 inhibit the oscillator 77, preventing the generation of a response signal to indicate a trouble condition in the initiating circuit 35.

The response signals corresponding to the state of the initiating devices which control contacts S1, S2 and S3 are generated according to fixed priorities. For example, in the event that more than one pair of contacts S1-S3 are closed, indicating that more than one variable is indicating an off-normal condition at a given time, the status of the highest priority variable, the alarm 1 function, or general alarm, indicated by contacts S1 is transmitted first. The alarm 2 function, or pre-signal alarm, (contacts S2) is assigned the next highest priority, and the alternate function (contacts S3) is assigned the lower priority of the contact initiated alarms.

In addition, as indicated above, the zone status monitor 31 also tests the continuity of the conductor loops 35A–35E of the initiating circuit 35 and indicates open circuit or trouble conditions in the alarm loops, conductors 35A–35C, or in the alternate function loop conductors 35D–35E by inhibiting the oscillator 77. A trouble condition in one of the alarm loopa has a higher priority than the alternate function but a lower priority than either the alarm 1 or alarm 2 conditions. Also, a trouble condition in the alternate function loop has a lower priority than the alternate function. These priority conditions and the corresponding responses are summarized in Table I.

TABLE I

| Priority | Function | Response Frequency |
|---|---|---|
| 1 | Alarm 1 | 2900Hz |
| 2 | Alarm 2 | 2640Hz |
| 3 | Alarm Trouble | No Response |
| 4 | Alternate Function | 2310Hz |
| 5 | Alternate Function Trouble | No Response |
| 6 | Normal | 2140Hz |

Any zone state continues indefinitely until it is either restored or replaced by a state of higher priority. Restoration is to a lower priority off-normal state, if one exists, or to the normal state.

The remaining zone status monitors, including zone status monitors 32–34 are identical to zone status monitor circuit 31 and perform a similar function in a different preprogrammed time slot.

The response frequency signals provided by the zone status monitors, such as zone status monitors 31–34 connected to line 24, are transmitted to the control panel over the transmission line 24 interspersed with the address pulses as shown in FIG. 2A, and received by the address pulse generator 26 and passed to the receiver 27.

After all zones have been addressed, the transmission of address pulses to the zone status monitors is terminated. Accordingly, the zone status monitors consume no power until the beginning of the next time frame. Moreover, since power for initiating and response circuits is only applied to one zone at a time, the current requirement from a control panel standby battery, if employed, is minimal.

The signal on a loop of N zones is thus seen to be a group of N + 1 address pulses, interspersed with N bursts of response frequencies (20 – 26 cycles in a burst), repeated in each time frame. This method of time division, although it allows interrogation of a large number of zones in a short period, say five seconds, permits the use of quite slow address pulses which can be shaped to insure monotonic transitions regardless of reflections from any foreseeable line length, together with highly redundant responses which need to change frequency only between time frames and which can be transmitted over voice band width lines. The multiplexing is accomplished with only one power source at the control panel for the loop of N zones.

RECEIVER

Figure 4:
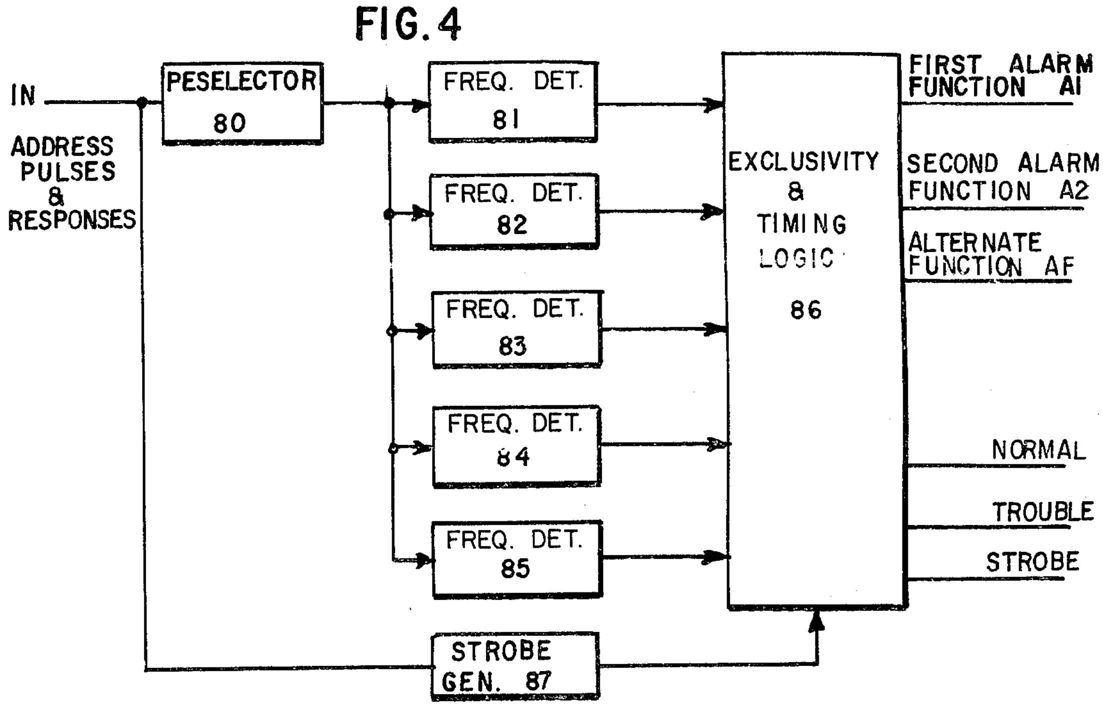
FIG. 4 is a block diagram of a receiver circuit employed in the system shown in FIG. 1.

A block diagram of the receiver 27 is shown in FIG. 4. The receiver includes a preselector circuit 80, a plurality of frequency detector circuits 81–85 and exclusivity and timing logic circuit 86.

The preselector circuit 80 passes only signals in the response signal band, approximately 2000 Hz to 3000 Hz, thereby separating the response frequencies from the power address pulses and also minimizing the effect on the receiver of extraneous noise signals as may be caused by RF pickup, for example.

The output of the preselector circuit 80 is extended to inputs of the five frequency detector circuits 81–85. Frequency detector circuits 82–85 detect signals at frequencies F1–F4, respectively, and frequency detector 81 detects signals at frequencies F1 or F2.

As the response signals provided by the various zone status monitors are sequentially extended to receiver during their assigned time slots, the frequency detector circuits 81–85 are selectively enabled in accordance with the frequency of the response signals extended to the receiver 27 to provide input signals to the exclusivity and timing logic 86.

For example, whenever the response signal of the addressed zone is at frequency F1, 2140 Hz, indicating a normal condition for that zone, frequency detectors 81 and 82 provide input signals to the exclusivity and timing logic circuits 86. Frequency detector 82 determines that there is a normal frequency, and frequency detector 81 determines that the normal frequency is not an alarm. Similarly, if the zone response is indicating an alternate function condition, the response signal at frequency F2, 2310Hz, enables frequency detectors 81 and 83 to provide inputs to the logic circuits 86.

Frequency detector circuits 84 or 85 are enabled to provide an input signal to the circuits 86 in the event that the zone response is at frequency F3 or F4, (2640Hz or 2900Hz), respectively, indicating an alarm 2 condition or an alarm 1 condition.

The exclusivity and timing logic circuits 86 process the input signals provided by the frequency detector circuits 81–85 to assure that only one response frequency is being provided at a time. The logic circuits 86 provide a signal on one of five outputs indicating an alarm 1 condition A1, an alarm 2 condition A2, an alternate function condition A2, a normal condition or a transmission error or trouble indication. The trouble indication is provided in the event that none of the frequencies F1–F4 is detected during a response period.

The exclusivity and timing logic circuit 86 are controlled by a strobe pulse generator 87 which in turn is connected to the transmission line 24 to be enabled by the power address pulses transmitted thereon. The strobe pulse generator 87 is enabled at the end of each power address pulse to provide a pair of strobe pulses at different times near the end of the response portion of each time slot, including the zeroeth time slot. Thus, the inputs supplied to the exclusivity and timing logic circuits 86 by the frequency detectors 81–85 are strobed twice. If in two strobes the same status exists, that is, alarm 1, alarm 2, alternate function, normal or transmission error, then a signal is provided at the appropriate output of the logic circuits 86.

The outputs of the receiver 27, provided by the exclusivity and timing logic circuits 86 are extended to the printer 28, FIG. 1 which demultiplexes and stores the data provided by the receiver 27 representing the zone responses and the condition of the transmission line 24. The output of the strobe generator 86 is also extended to the printer 28 to enable identification of the source of the response data provided during successive time slots.

DETAILED DESCRIPTION

Address Pulse Generator

Figure 6:
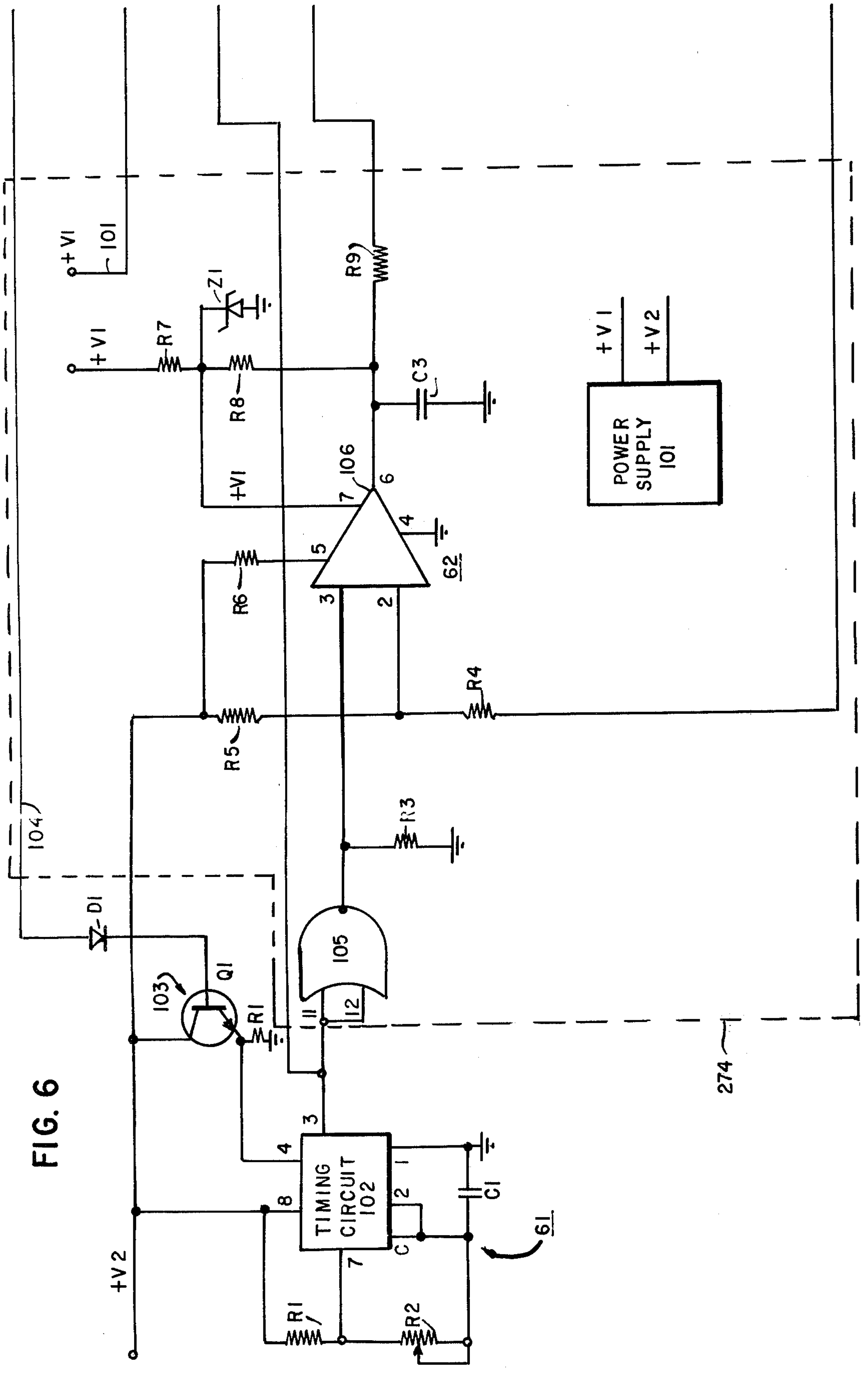
FIGS. 6–9 when arranged as shown in FIG. 21 provide a schematic circuit and partial block diagram for the address pulse generator shown in block form in FIG. 2.
Figure 7:
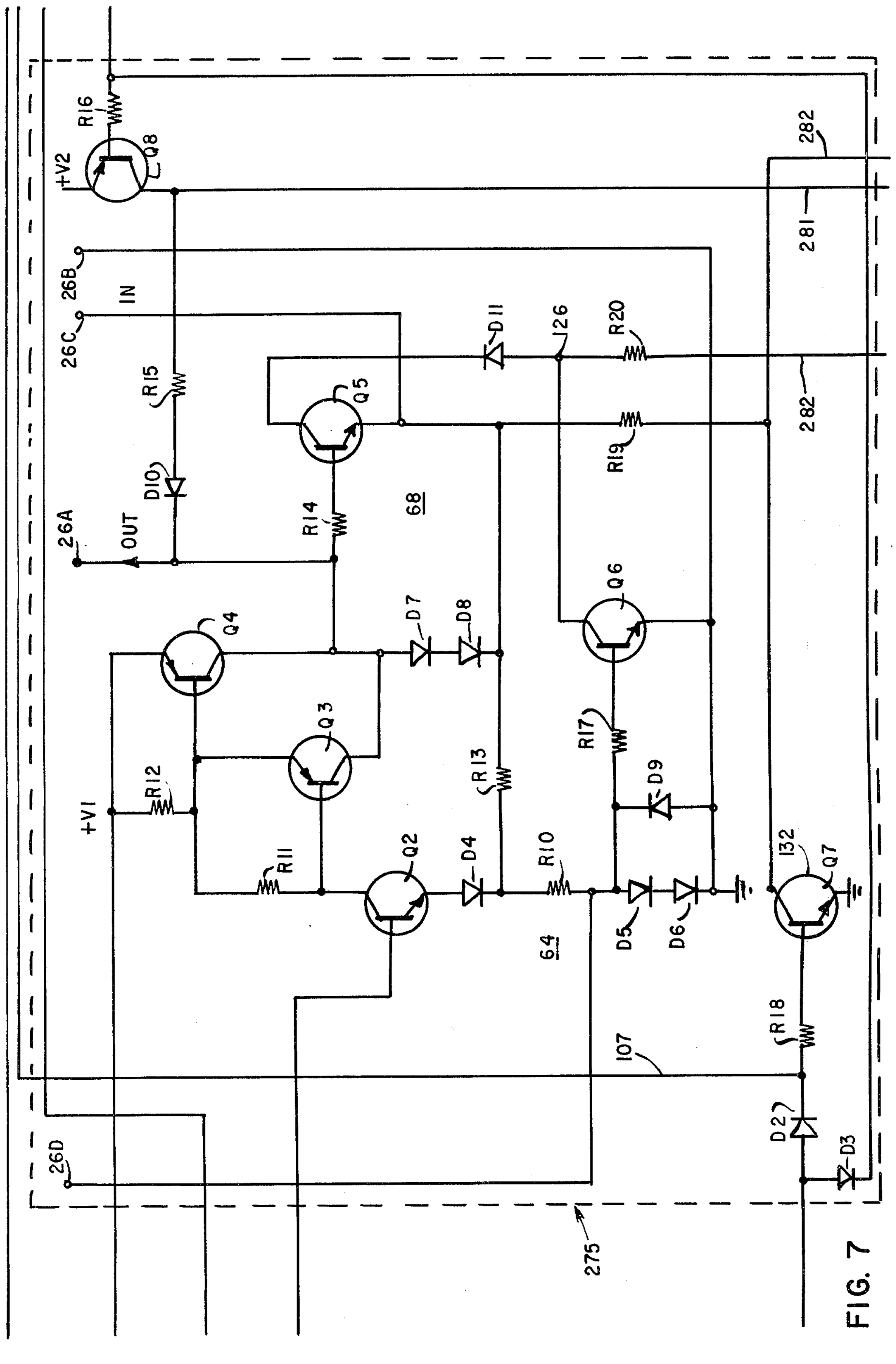
Figure 8:
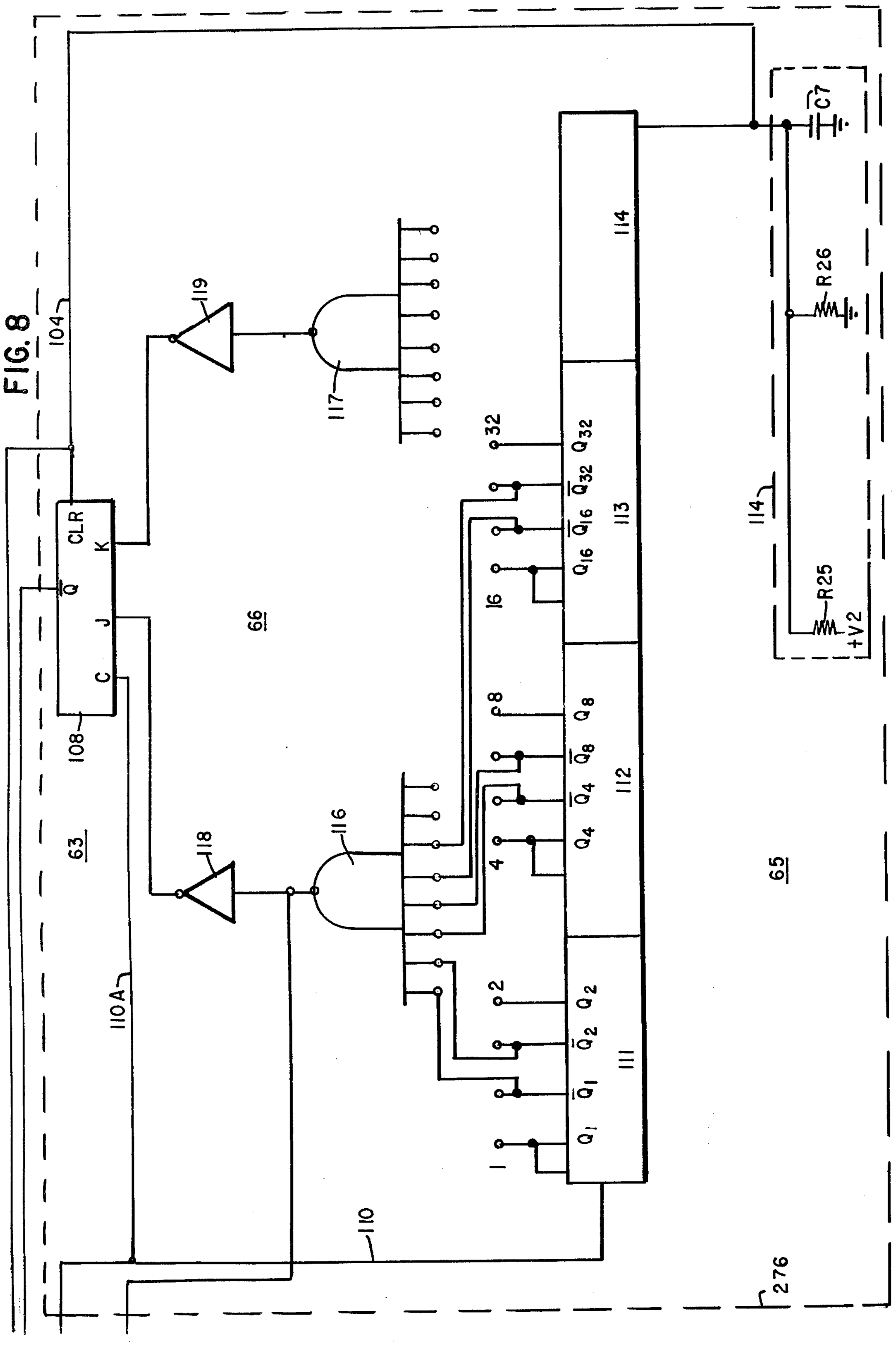
Figure 9:
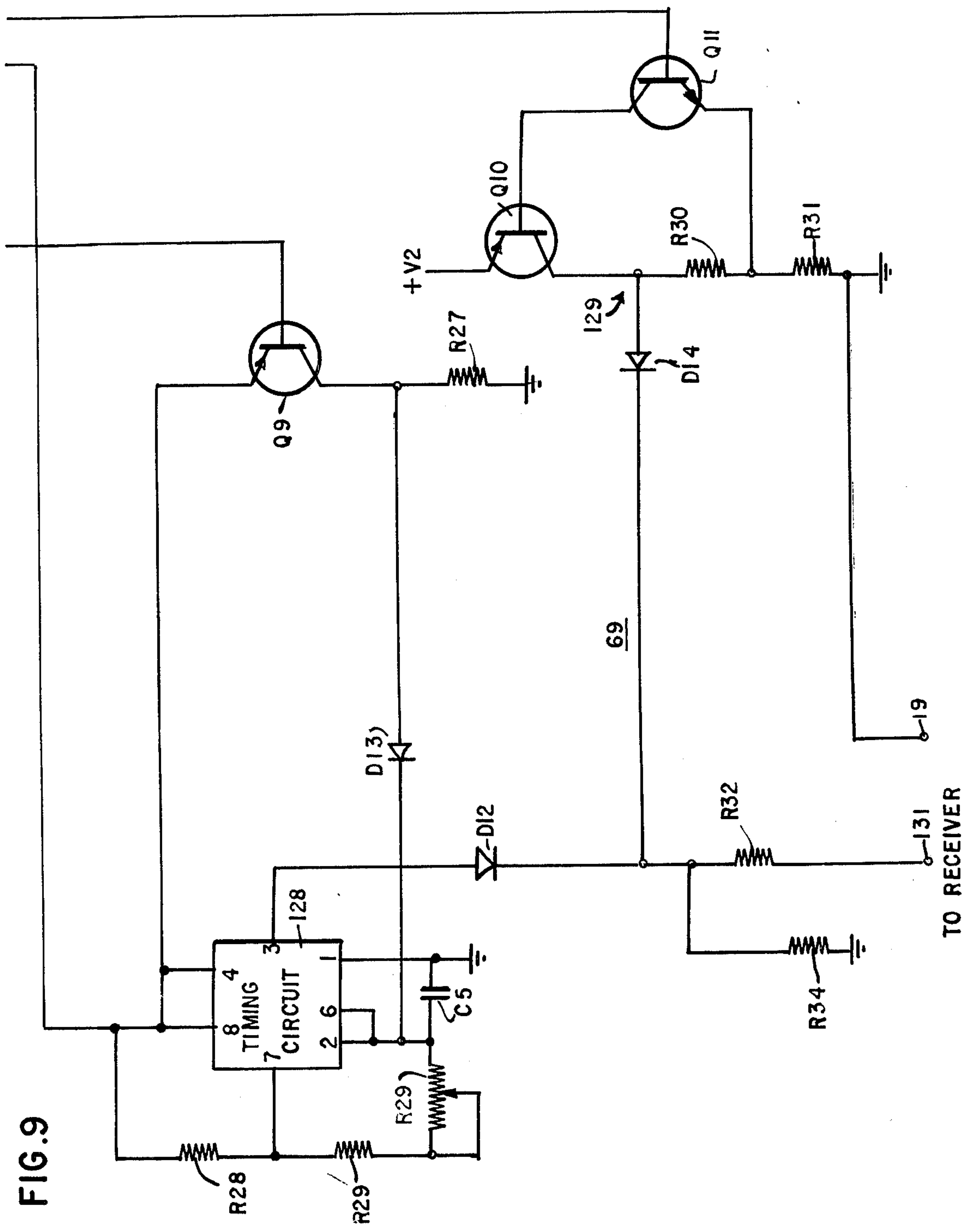
Figure 21:
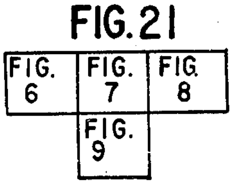
FIG. 21 shows how

FIGS. 6–9 when arranged as shown in FIG. 21 provide a schematic circuit diagram for the address pulse generator 26 shown in block form in FIG. 2. The time slot rate generator 61 and gate circuit 62 are shown in FIG. 6, the power amplifier 64 and line continuity circuit 68 are shown in FIG. 7, the latch circuit 63, the counter 65 and the decoder circuit 66 are shown in FIG. 8 and the response generator 69 is shown in FIG. 9.

Power is supplied to the address pulse generator circuit 26 by a power source 101 shown in FIG. 6 which provides 24 volts DC at terminal +V1, and a regulated 5 volt DC voltage at terminal +V2.

The time slot rate generator or oscillator circuit 61 may comprise a timing circuit 102 such as the type NE555V monolithic timing circuit commercially available from Signetics. The timing circuit 102 is connected for operation as a free-running multivibrator. The free-running frequency and duty cycle are controlled by two external resistors R1 and R2 and a capacitor C1. Resistor R2 is variable to select the frequency of oscillation. In the exemplary embodiment, the oscillator 61 generates a square wave output signal at a frequency of 51.6 Hz.

Power is supplied to pin 8 of the timing circuit 102 from terminal +V2 of the power supply 101. Resistors R1 and R2 are connected between pins 7 and 8 and 7 and 6, respectively, of the timing circuit 102, and capacitor C1 is connected between pins 6 and 1 which is connected to ground. The output of the oscillator 61 is provided at pin 3 of the timing circuit 102.

When power is initially applied to the address pulse generator 26, an inhibit circuit 103, including a transistor Q1, is controlled by an output of a reset circuit 114 shown in FIG. 8 to prevent the oscillator 61 from turning on until the counter 65 is reset to zero. When power is applied, a positive pulse extended over conductor 104 and diode D1 to the base of transistor Q1 turns transistor Q1 on providing a positive level at pin 4 of the timing circuit 102, inhibiting operation of the oscillator 61. Once energized, the oscillator 61 is free-running.

The signal output of the oscillator 61 is extended over an inverter 105 to an input of the gating circuit 62. The gate circuit 62 comprises an operational transconductance amplifier 106 such as the type CA3080 commercially available from RCA.

The operational amplifier 106 has a non-inverting input at pin 3 connected to the output of the inverter 105 of the oscillator 61. An inverting input at pin 2 is connected over resistor R4, diode D2, and conductor 107 to the negative output $\overline{Q}$ of a JK flip flop 108, which comprises the latch circuit 63. The inverting input of operational amplifier 106 is also connected over resistor R5 to + V2.

Bias current from source + V2 is extended over resistor R6 to pin 5 of the operational amplifier 106 which sets the output current to approximately 1 milliamp. Pin 7 of the operational amplifier 106 is connected over resistor R7 to + V1 and pin 4 is connected to ground. Resistor R8 is connected between the junction of resistor R7 and pin 7 and the output of the operational amplifier at pin 6. Capacitor C3 is connected between pin 6 and ground.

Whenever the gate circuit 62 is enabled by the latch circuit 63 to follow the output of the oscillator 61, output current from pin 6 of the operational amplifier 106 charges and discharges capacitor C3 between 0 and +24 volts in a nearly linear way. Additional current from source + V1 provided over resistors R7 and R8 causes the voltage at pin 6 to rise faster and more linearly, at approximately a 0.5 millisecond rate, as shown in FIG. 6A, and fall at a variable rate so that the fall time is about 1 millisecond. However, the rate of change is reduced when the amplitude of the pulse falls below 5 volts as indicated in FIG. 6A.

Figure 5:
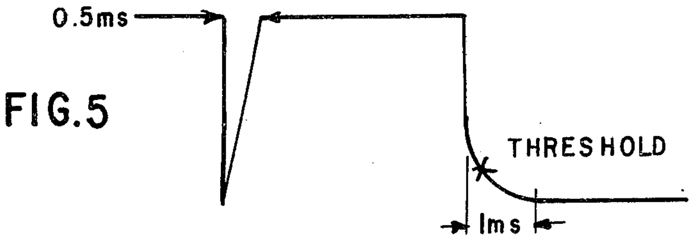
FIG. 5 shows the voltage wave form for address pulses generated by the address pulse generator shown in detail in FIGS. 6–9.

The more rapid rate of fall is suitable for more accurate counting and timing (the timing threshold may range from 6 to 7 volts), while the less rapid rate of fall below 5 volts is more easily separated from the response frequencies F1–F4 in the preselector circuit 80 of the receiver 27 (FIG. 5).

Rise and fall times no less than 0.5 milliseconds are desirable to minimize RF radiation from the transmission loop 24, but excessive rise or fall times may minimize the power available to the zone status monitors, or the time available for the ensuing responses.

Whenever the gate circuit 62 is enabled, the operational transconductance amplifier 106 and associated circuit elements including resistors R5–R8 and capacitor C3 are responsive to each square wave pulse provided by the oscillator 61 to produce the trapezoidal shaped pulses, shown in FIG. 2B, which have an on-off time of approximately 9 milliseconds.

The trapezoidal shaped pulses thus provided are extended to the power amplifier 64 which amplifies the pulses to provide power address pulses.

The power amplifier 64 is comprised of three cascaded power transistors Q2–Q4 and associated bias resistors R10–13 and level setting diodes D4–D8. Transistor Q2 serves as the input stage of the power amplifier 64 and has its base connected over resistor R9 to the output of the gate circuit 62 at pin 6 of the operational amplifier 106. The collector of transistor Q2 is connected over resistors R11–R12 to + V1 and to the base of transistor Q3. The emitter of transistor Q2 is connected over diodes D4–D6 and resistor R10 to ground.

The emitter of transistor Q3 is connected over resistor R12 to + V1 and to the base of transistor Q4. The collectors of transistors Q3 and Q4 are connected together and referenced to ground over a circuit path including diodes D7 and D8, resistors R13 and R10 and diodes D5–D6. The emitter of transistor Q4 is connected to + V1.

The transistor Q4 serves as the output stage of the power amplifier to extend the address pulses to the loop 24. Accordingly, the collector of transistor Q4 is connected to terminal 26A of the address pulse generator 26 which is connected to one end of the positive conductor 24A of the Class A loop 24. The other end of the conductor 24A is connected to terminal 26C which in turn is connected to the junction of resistor R13 and the cathode of diode D8 in the collector circuit of transistor Q4.

One end of the negative conductor 24B of the Class A loop 24 is connected to terminal 26B of the address pulse generator 24 which in turn is connected to ground. The other end of the negative conductor 24B is connected to ground over diodes D5 and D6.

It is pointed out that the address pulse generator 26 may also be connected for operation in a Class B mode.

For Class B operation, terminals 26A and 26C are commonly connected to the positive line 24A and terminals 26B and 26C are connected together to the negative line 24B. No end of line device is required for Class B operation since the zone status monitors 31–34, for example, are connected across the Class B circuit should an open condition occur. The lack of response of the zone status monitors beyond the point of the open circuit condition will cause a trouble indication to be registered at the control panel 25.

The square-wave output of the oscillator 61 is also extended over conductor 110 to the input of the counter 65, shown in FIG. 8 as a rectangular block subdivided into a plurality of sub-blocks 111–114. Each of the sub-blocks may comprise a pair of bistable circuits, such as the type 74L73N commercially available from Texas Instruments, interconnected to form an 8-bit counter providing binary coded outputs over positive or true outputs Q–1–Q32 and negative or false outputs $\overline{Q1}$–$\overline{Q32}$, representing counts from zero to 256. Not all of the internal wiring of the counter 65 is shown for sake of clarity in the drawings, but it is to be understood that those skilled in the art can provide the necessary internal wiring to accomplish the described functions of the counter 65.

A reset circuit 114', including resistors R25 and R26 and a compacitor C7 permits the counter 66 to be set to a count of zero, when power is initially applied to the address pulse generator circuit 26. In addition, the reset circuit 114' also resets the latch circuit 108 to inhibit gate 62.

When the oscillator is enabled, the counter 65 continuously counts the output pulses provided by the oscillator 61 and enables the decoder circuit 66 at programmed counts to effect setting and resetting of the flip flop 108 of the latch circuit 63 and thus determine the number of address pulses that are transmitted over the transmission line 24 to the zone status monitors.

The decoder circuit 63 is comprised of a pair of NAND gates 116, 117 and a pair of inverters 118, 119. NAND gate 116 has inputs individually connected to different ones of the false outputs $\overline{Q1}$, $\overline{Q2}$, $\overline{Q4}$, $\overline{Q8}$, $\overline{Q16}$, $\overline{Q32}$, $\overline{Q64}$ and $\overline{Q128}$ of the counter circuit 65. The output of NAND gate 116 is connected over inverter 118 to the J input of the latch circuit flip flop 108. The clock input C of the flip flop 108 is connected over conductors 110A and 110 to the output of the oscillator.

Accordingly, NAND gate 116 will be enabled whenever the counter reaches a count of zero to provide an output over NOR gate 118 to set flip flop 108 thereby enabling gate 62 to pass the output of the oscillator 61 to the power amplifier 64 permitting the transmission of address pulses over the loop 24.

The inputs of NAND gate 117 are programmably connected to preselected ones of the positive and negative outputs of the counter 65 so as to be enabled whenever the counter 65 reaches a preselected count. In the present example, where thirty zones are being monitored, the inputs of NAND gate 117 are connected to outputs $\overline{Q1}$, Q2, Q4, Q8, Q16, $\overline{Q64}$ and $\overline{Q128}$ such that NAND gate 117 is enabled when the counter reaches a count of thirty. The output of NAND gate 117 is connected over NOR gate 119 to the K input of the flip flop 108. Flip flop 108 resets on the falling edge of the next clock pulse after input K of the flip flop 108 is high, the same falling edge which advances the counter to count thirty-one. Accordingly, gate 62 is disabled and the transmission of further address pulses is inhibited.

Thus, the counter 65 is conveniently programmed for the number of zones (thirty in the exemplary embodiment), but power pulses and responses are not disabled until after the power pulse and response time slot for zone thirty. It is pointed out that if fewer zones than thirty are to be monitored, the connections of the inputs of NAND gate 117 to outputs of counter 65 will be modified so that NAND gate 117 is enabled after N + 1 address pulses have been transmitted, where N is the number of zones being monitored.

On the other hand, if a larger number of zones, say 250, were to be monitored, appropriate connections of inputs of NAND gate 117 to outputs of the 8-bit counter will enable NAND gate 117 to control the transmission of a separate address pulse for each of the 250 zones.

When the counter 65 reaches a count of zero, gate 116 is enabled to set the latch circuit flip flop 108. Accordingly, the gate circuit 62 is enabled permitting the output of the oscillator 61 to be extended to the power amplifier 64.

During the zeroeth time slot, when the zeroeth power pulse is impressed upon the transmission loop 24 over terminals 26A and 26C, the zone status monitors 31–34 connected thereto will be conditioned to count further address pulses. However, none of the zone status monitors 31–34 responds following the zeroeth power pulse of a given frame. At such time the decoder circuit 67 enables the line continuity test circuit 68, which is comprised of transistors Q8, Q5 and Q6 shown in FIG. 7 and transistor Q9 shown in FIG. 9. The line continuity test circuit in turn controls the response generator 69 which is comprised of a timing circuit 128 and amplifier-limiter 129 including transistors Q10 and Q11.

Transistor Q8 is operable when rendered conductive to extend line supervisory current to the transmission line 24. The conductivity of transistor Q8 is controlled by NAND gate 116. The output of NAND gate 116 of the decoder circuit 67 is connected over a resistor R16 to the base of transistor Q8. The emitter of transistor Q8 is connected to + V2 and the collector of transistor Q8 is connected over resistor R15 and diode D10 to terminal 26A and thence to the positive conductor 24A of the transmission line 24. When gate 116 is enabled, the output of gate 116 causes transistor Q8 to turn on supplying supervisory current to the transmission line 24 over the emitter-collector circuit of transistor Q8, resistor R15 and diode D10.

Transistor Q5 and Q6 monitor the continuity of the positive and negative conductors 24A, 24C and 24B, 24D, respectively. Referring to FIG. 7, the base of transistor Q5 is connected over resistor R14 to the positive line conductor 24A at terminal 26A and also over series connected diodes D7, D8 to the emitter of transistor Q5. The emitter of transistor Q5 is also connected to positive line conductor 24C at terminal 26C. The collector of transistor Q5 is connected over reverse connected diode D11 to the collector of transistor Q6 at point 126. The base of transistor Q6 is connected over resistor R17 to the negative line conductor 24D at terminal 26D and also over series connected diodes D5, D6 to the emitter of the transistor Q6. The emitter of transistor Q6 is also connected to negative line conductor 24B at terminal 26B.

The base of transistor Q9 (FIG. 9) is connected to point 126, effectively at the collectors of transistors Q5 and Q6. The emitter of transistor Q9 is connected to pins 4 and 8 of the timing circuit 128 which may be the Signetics monolithic timing circuit, Type NE555V connected for operation as a triggerable astable multivibrator, in a manner similar to timing circuit 102 employed in the oscillator circuit 61. Resistors R28 and R29 and capacitor C5 determine the frequency of oscillation of the response oscillator 69, which in the present example is 2140Hz, corresponding to frequency F1, the normal frequency.

The response oscillator 69 is enabled by a voltage at + V2 level extended over conductor 130 from the collector of transistor Q8 to pin 8 of the timing circuit 128 whenever transistor Q8 is enabled.

The collector of transistor Q9 is connected to ground over resistor R27 and over diode D13 to a trigger input of the timing circuit 128 at pin 2.

In operation, transistors Q5, Q6 and Q9 are normally nonconducting and the response oscillator 128 is deenergized.

When the conductors 24A–24D are continuous, supervisory current flows from over transistor Q8, resistor R15 and diode D10, through positive conductor 24A, resistors R13 and R10 and negative conductor 24B to ground. The continuity of conductor 24A maintains transistor Q5 cut off, while the continuity of conductor 24B maintains transistor Q6 cut off. No current is drawn through point 126, and accordingly, transistor Q9 remains cut off. The collector of transistor Q9 is held low by the ground connection over resistor R27, and reversed biased diode D13 prevents any influence on the triggering of response oscillator 128.

If conductor 24A (or 24B) is discontinuous, the supervisory current flows through diodes D7, D8 (or D5, D6) forward biasing the base of transistor Q5 (or Q6) with a sufficient fraction of the current, as limited by resistor R14 (or R17) to draw collector current through point 126, forward biasing transistor Q9. The bias level at the emitter of transistor Q9 does not change since the emitter of transistor Q9 is connected to + V2 over transistor Q8 which is conducting during the zeroeth time slot. However, the potential at the collector of transistor Q9 increases, increasing the potential at the trigger terminal, pin 2 of timing circuit 128 through diode D13, thus preventing the timing circuit 128 from triggering on any cycle of the normal frequency thereby inhibiting oscillation.

Thereafter, the next pulse provided by oscillator circuit 61 causes the first power address pulse to be generated and causes the counter 65 to step to count one causing gate 117 to be disabled, removing the set input from the JK flip flop 108 and rendering transistor Q8 non-conductive so that the flow of line supervisory current in the transmission 24 is interrupted.

The JK flip flop 108 remains set until the counter 65 reaches a count of thirty after thirty-one power address pulses have been impressed on the loop 24.

When the first power address pulse is generated and extended to the line 24, zone status monitor 31, which has an address of one, is energized. Accordingly, zone status monitor 31 returns its response at the termination of the second address pulse and before the third address pulse is transmitted.

The response signal provided by zone status monitor 31 is received by the address pulse generator 26 at terminal 26C and extended over resistor R19 to the base of transistor Q11 which forms the input stage of the response generator amplifier circuit 129. The collector of transistor Q11 is connected to the base of transistor Q10 which has an emitter connected to + V2. The collector of transistor Q10 is connected over resistors R30, R31 to ground. The emitter of transistor Q11 is connected to the junction of resistors R30 and R31. The output of the amplifier 129 at the collector of transistor Q10 is extended over diode D14 and resistor R32 to terminal 131 which is connected to the receiver 27. Thus the response signals provided by each of the zone status monitors as received at terminal 26C are extended over amplifier-limiter 129 to the receiver 27. Amplifier-limiter 129 fixes the amplitude of the response signals at a predetermined value regardless of whether such signals have been decreased in amplitude as the result of drops caused by diode D7 and D8, and/or diode D9 because of wire discontinuity. Regardless of which side of a possible discontinuity the response signals originate from, the response signals all pass to the receiver 27 with standardized amplitude. Since the information of the response signal is conveyed solely by the frequency of the response signal the information is preserved regardless of diode drops or limiting.

Referring to FIG. 7, a noise inhibit circuit 132 including a transistor Q7 has its base connected over resistor R18 to the negative output $\overline{Q}$ of the latch flip flop 108. The emitter of transistor Q7 is connected to ground and the collector of transistor Q7 is connected to the base of transistor Q11 of the response generator amplifier 129. Transistor Q7 is cut off whenever the latch flip flop 108 is set during the time slots one to thirty during which times the zone responses are received. However, whenever the flip flop 108 is reset, transistor Q7 is turned on, grounding the base of transistor Q11 and preventing noise signals which may be present on the transmission line 24 from being passed to the receiver 27.

As the oscillator 61 continues to cycle, further power address pulses will be generated and extended to the transmission line 24 to effect readout of the remaining zone status monitors, including zone status monitors 32–34, during different successive time slots. The counter 65 counts the pulses provided by the oscillator 61 and when the counter 65 reaches a count of thirty, at which time all of the zones will have been interrogated, NAND gate 118 of the decoder circuit 66 is enabled to effect reset of the JK flip flop 108. When flip flop 108 is reset, the positive signal provided at the negative output $\overline{Q}$ of the flip flop 108 inhibits gate 62 over diode D2 and resistor R4, preventing further address pulses from being extended to the transmission line 24. The counter 65 continues to count the pulse outputs provided by the oscillator 61 and when the counter 65 again reaches a count of zero, the latch circuit flip flop 108 is enabled, the continutiy of the loop 24 is tested again and a further block of power address pulses is transmitted to the zone status monitors over the transmission line 24.

Zone Status Monitor

Figure 10:
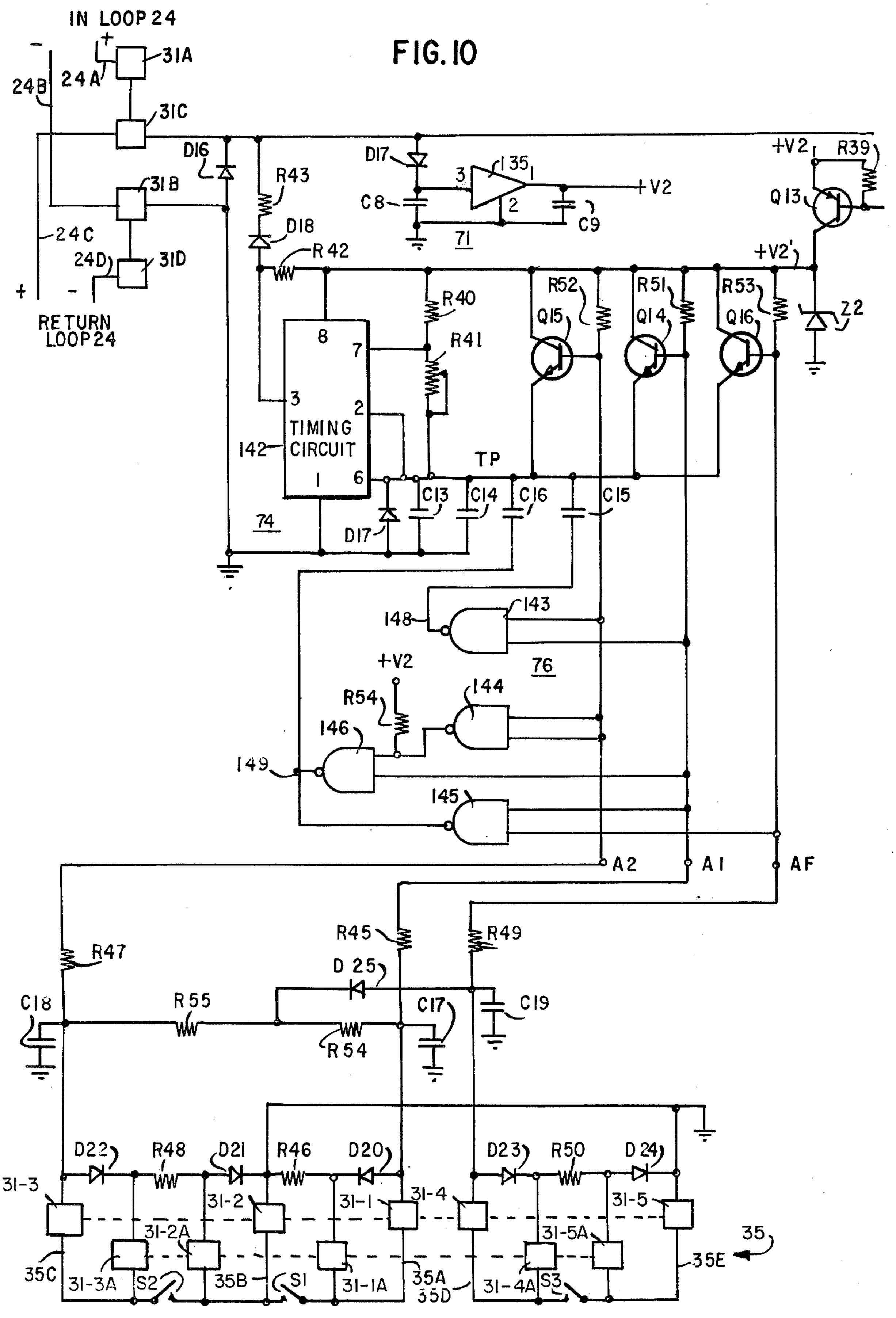
FIGS. 10 and 11 when arranged in side by side relationship as shown in FIG. 22 provide a schematic circuit and partial block diagram for the zone status monitor circuit shown in block form in FIG. 3.
Figure 11:
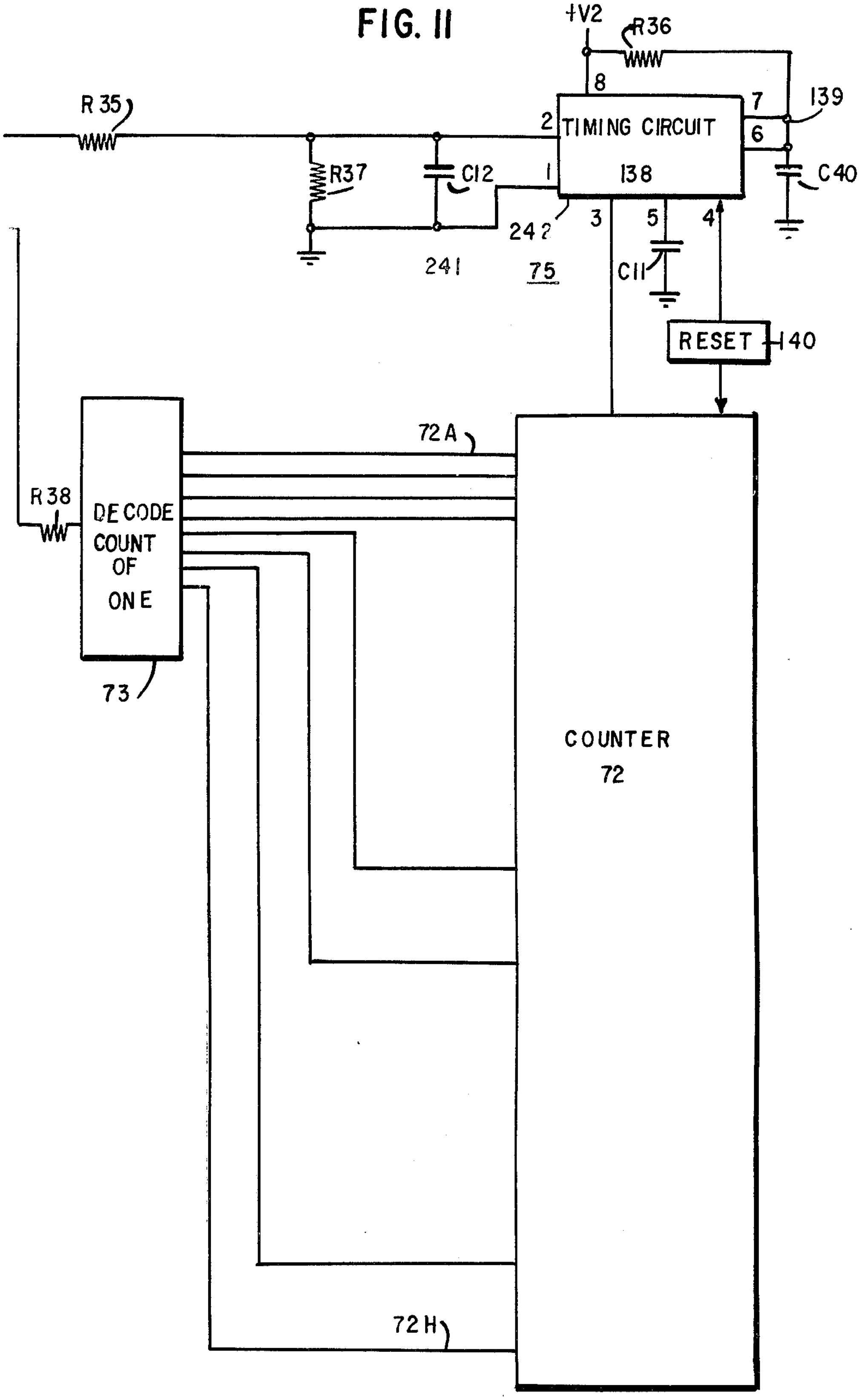
Figure 22:
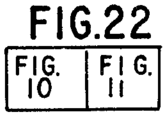
FIG. 22 shows how

Referring to FIGS. 10 and 11, when arranged in side-by-side relationship as shown in FIG. 22, there is shown a schematic circuit and partial block diagram for the zone status monitor circuit 31.

The positive and negative conductors 24A and 24B, respectively, of the transmission line 24 at the incoming side of the loop are connected to terminals 31A and 31B, respectively, of the zone status monitor circuit 31. The input of the zone status monitoring circuit is also connected to the return side of the positive and negative conductors 24A, 24B of the loop 24 over terminals 31C and 31D, respectively. Terminal 31A is connected to terminal 31C and terminal 31B is connected to terminal 31D. A diode D16, connected between terminals 31B and 31C, protects the zone status monitor from reversed connection of the loop wires and from negative-going noise on the loop. Terminal 31B is connected to a point of reference potential or ground in the zone status monitor 31.

The address pulses transmitted over the line 24 are extended over input terminal 31A to power circuit 71 which includes a voltage regulator circuit 135, such as the Type UGH 7805, which is commercially available from Fairchild Semiconductor. The positive input line 24A is connected over terminals 31A, 31C and diode D17 to the input of the regulator circuit at pin 3 of the amplifier. The input of circuit 135 is also connected over a capacitor C8 to a point of reference potential or ground for the zone status monitor circuit 31. A second pin 2 of the circuit 135 is connected to ground. The output of the power circuit 71 at pin 1 is connected to a terminal + V2. A capacitor C19 is connected between terminal + V2 and ground. The power circuit 71 derives power from the address pulses to provide an energizing voltage +5VDC at terminal + V2 for the logic circuits of the zone status monitor 31.

With the receipt of the zeroeth address pulse of each frame, capacitor C8 begins to charge at a slow rate, increasing the potential at input pin 3 of the operational amplifier 135. Capacitor C8 may for example, be a 75 microfarad capacitor which charges to a value sufficient to enable operational amplifier 135 to provide a voltage at a +5VDC level at terminal + V2.

At the end of the first power address pulse capacitor C8 begins to discharge over the operational amplifier circuit 135. However, the discharge rate is sufficiently slow to permit voltage + V2 to be maintained for energizing the logic circuits of the zone status monitors for the time between successive address pulses.

The address pulses received at zone status monitor 31 are also extended over a resistor R35 to the input of the pulse detecting circuit 75 which is comprised of a timing circuit 138 which in the exemplary embodiment is operable when energized to be responsive to the trailing edge of each address pulse to provide a pulse of a predetermined width for enabling the counter circuit 72. Alternatively, the address or synchronizing pulse can be integrated through the use of a suitable integrating circuit to provide a pulse for triggering the monostable circuit 138. The timing circuit 38 is energized by the power circuit 71 after the zeroeth address pulse of each frame and remains energized until the last address of each frame has been received.

The timing circuit 138 may comprise the type NE555V Timing Circuit, commercially available from Signetics, connected for operation as a monostable multivibrator circuit. The monostable circuit 138 is triggered by the trailing edge of each address pulse extended to a trigger input at pin 2 thereof to provide a pulse output, the duration of which is determined by external components including a resistor R36 and a capacitor C10. Resistor R36 and capacitor C10 are connected in series between terminal +V2 and ground. The junction of resistor R36 and capacitor C10 at point 139 is connected to pins 6 and 7 of the timing circuit 138. Timing circuit 138 also has pin 8 connected to + V2, pins 1 and 3 connected to ground and pin 5 connected over a capacitor C11 to ground. A pin 4 of the timing circuit 138 is connected to a reset circuit 140 which provides for resetting of the timing circuit when the timing circuit 138 is initially energized over +V2 at the beginning of each frame. A resistor R37 and a capacitor C12, each connected between the trigger input of the monostable circuit 138 at pin 2 and ground, provide a filter circuit at the input of the monostable circuit 138.

Monostable circuit 138, which serves to detect the address pulses transmitted over line 24 while being substantially immune to noise signals on the line 24, benefits from RC filtering of the potentially noisy address pulses and from the hysteresis furnished by the integrated circuits which comprise the timing circuit 138. However, the monostable circuit 138 principally avoids false detection through the long duty cycle of the monostable 138.

The on time of monostable 138 lasts at least 50% and preferably 90% of the address pulse period so that it will not accept a new falling edge until the peak portion of the address pulse, shown in FIG. 5, when noise immunity is the highest, and preferably at a maximum frequency only slightly higher than the intended address pulse rate.

The output of the timing circuit 138 at pin 3 is extended to the counter 72. In the examplary embodiment, wherein thirty zone status monitors are controlled by address pulse generator 27, the counter 72, illustrated in FIG. 11, may comprise a six-bit counter which is similar to the eight-bit counter 65 of the address pulse generator 27 shown in FIG. 8. The counter 72 is operable when energized after the first address pulse of each frame to count further address pulses in each frame and to provide binary coded signals over outputs 72A–72H to the decode circuit 73 such that the decoder circuit 73 will be enabled when the counter 72 reaches a preselected count which represents the address for the zone status monitor circuit 31. In the exemplary embodiment, zone status monitor circuit 31 is assigned the address 1 and accordingly the decoder circuit 73 is programmed to decode a count of one.

When enabled, decoder circuit 73 provides an output for effecting energization of the response generator 74 over a transistor Q13. Transistor Q13 has a base connected over a resistor R38 to the decoder circuit 73 and to +V2 over a resistor R39. The emitter of transistor Q13 is also connected to voltage source + V2. The collector of transistor Q13 is connected to ground over a Zener diode Z2 and also serves as a voltage source point + V2′ for the response generator circuits 74.

The response generator 74 includes an oscillator 77 and associated control logic 76 including transistors Q14–Q16 and NAND gates 143–146. The oscillator 77 comprises a timing circuit 142 such as the Type NE555V, commercially available from Signetics, connected for operation as a triggerable free-running multivibrator. The multivibrator 142 is enabled whenever an energizing voltage is applied to pin 8 thereof to oscillate at one of the four frequencies F1–F4 as determined by resistors R40–R41 and capacitors C13–C16. Resistors R40 and R41 are connected in series between +V2′ and the threshold input of the timing circuit 142 at pin 6. The junction of resistors R40 and R41 is connected to a discharge output of the timing circuit at pin 7. Capacitors C13–C14 are connected between pin 6 of the timing circuit 142 and ground, and capacitors C15–C16 are connected between pin 6 and ground over NAND gates 143 and 144–146, respectively, to enable the frequency of oscillation to be selected as a function of the status of gates 143–146. A diode D17 is connected in parallel with capacitors C13–C14 between ground and pin 6 of the timing circuit 142.

A trigger input of the timing circuit at pin 2 is connected to pin 6. The output of the timing circuit at pin 3 is extended over a diode D18 and a resistor R43 to terminal 31C which is connected to the return side of the positive conductor 24A of the loop 24.

NAND gate 143 has a first input connected to a conductor A1 and a second input connected to a conductor A2. NAND gate 143 is normally enabled to provide a ground potential at the output thereof which is connected to one side of capacitor C15 at point 148.

NAND gate 144 has a pair of inputs commonly connected to conductor A2. The output of NAND gate 144 is connected to a first input of NAND gate 146 which is also connected over a resistor R54 to +V2′. A second input of NAND gate 146 is connected to conductor A1. NAND gate 144 is normally enabled to provide a ground level output which disables NAND gate 146. The output of NAND gate 146 is connected to one side of capacitor C16 at point 149.

NAND gate 145 has a first input connected to conductor A1 and a second input connected to conductor AF. The output of NAND gate 145 which is normally enabled, is also connected to point 149 at the output of NAND gate 146 and normally maintains point 149 at ground potential. Gates 143–146 are open-collector gates providing a grounded output for logic 0 and a floating output for logic 1. The logic 1 output of gate 144 is converted to a high level by means of resistor R54 to + V2, but the outputs of gates 143, 145 and 146, without pull-up resistors, function as switches, floating through any voltage swing within their ratings for logic 1, or allowing substantially no voltage change from ground for logic 0.

The status of gates 143–146 and thus the frequency of oscillation of the multivibrator are controlled by the initiating circuit 35 to provide a frequency output at one of the four frequencies F1–F4 as a function of the conditions of contacts S1, S2, and S3 of the initiating circuit 35. In addition, the continuity of the conductors 35A–35E which connect the contacts S1, S2, and S3 to the logic circuits 76 of the response generator 74 are monitored by transistors Q14–Q16 which are each individually operable to inhibit the multivibrator 142 whenever one or more of the conductors 35A–35E becomes open-circuited.

The initiating circuit 35, which is shown in FIG. 10 connected for Class A operation, includes a plurality of pairs of terminals 31–1, 31–1A through 31–5, 31–5A, including a separate pair of terminals for each of the conductors 35A–35E which connect the contacts S1–S3 to the response generator 74.

Conductor 35A extends from terminal 31–1 into the zone and back to terminal 31–1A, and conductor 35B extends from terminal 31–2 into the zone and back to terminal 31–2A. The alarm function contacts S1 are connected between conductors 35A and 35B. Conductor 35C extends from terminal 31–3 into the zone and back to terminal 31–3A in a continuous loop. Alarm 2 contacts S2 are connected between conductors 35B and 35C, conductor 35B serving as a common conductor for both the alarm 1 and alarm 2 function contacts.

Conductor 35D extends from terminal 31–4 into the zone and back to terminal 31–4A, and conductor 35E extends from terminal 31–5 into the zone and back to terminal 31–5A. Alternate function contacts F3 are connected between conductors 35D and 35E.

The contacts S1–S3 control the response frequency provided by the timing circuit 142 by controlling the potential at the inputs of gates 143-146 which in turn supply grounds to capacitors C15 and C16 as a function of the state of gates 143–146. NAND gate 143 has a first input at point A1 connected over resistor R51 to + V2′ and to ground over a circuit path which can be traced from conductor A1 over resistor R45 terminal 31–1 conductor 35A to terminal 31–1A and resistor R46. A second input of gate 143 is connected over a resistor R52 to + V2′ and to ground over a circuit path which can be traced from conductor A2 over resistor R47 to terminal 31–3, over conductor 35C to terminal 31–3A over resistor R48 to terminal 31–2A over conductor 35B to terminal 31–2 which is connected to ground. Gate 144 has a pair of inputs commonly connected together to conductor A2. Gate 145 has a first input connected to conductor A1 and a second input connected to conductor AF which in turn is connected over a resistor R53 to + V2′ and to ground over a circuit path which can be traced from conductor AF over resistor R49 to terminal 31–4, thence over conductor 35D to terminal 31–4A over resistor R50 to terminal 31–5A and over conductor 35E to terminal 31–5 which is connected to ground.

Resistors R45, R47 and R49 limit noise currents to the inputs of NAND gates 143–146 and set the line resistance limit for the supervision of conductors 35A–35E.

Thus for the alarm 1 circuit, including contacts S1 which is connected between conductors 35A and 35B the path to ground is completed over resistor R46 which is connected betwen terminals 31-1 and 31-1A. Similarly, for the alarm 2 condition loop including contacts S2, which are connected between conductors 35B and 35C, the path to ground is completed over resistor R48 which is connected between terminals 31-3A and 31-2A. In the alternate function condition loop, including contacts S3, which are connected betwen conductors 35D and 35E, the path to ground is completed over resistor R50 which is connected between terminals 31-4A and 31-5A.

Contacts S1 are connected over conductors 35B and 35A to terminals 31-1 and 31-1A, respectively, and thus in parallel with resistor R46. Accordingly, whenever contacts S1 are closed, resistor R46 is shorted out.

Similarly, contacts S2 and S3 are connected in parallel with resistors R48 and R50, respectively, and are operable to short out resistors R48 and R50 whenever contacts S2 or S3, respectively, are closed. Thus, whenever contacts S1, S2 or S3 are closed, the potentials on conductors A1, A2, or AF, respectively, approaches ground to effect disabiling of gates 143 and 145 which have inputs connected to such conductors.

Continuity supervision of conductors 35A–35E is effected through the use of diodes D10–D24. Diode D20 is connected between terminals 31-1 and 31-1A and is normally shorted out by conductor 35A which is connected between such terminals. Diode D21 is connected between terminals 31-2A and 31-2 and is effectively shorted out by conductor 35B which is connected to such terminals. Diode D22 is connected between terminals 31-3 and 31-3A and is normally shorted out by conductor 35C. Diode D23 and D24, which are connected between terminal pairs 31-4A and 31-5A, 31-5, respectively, are normally shorted out by conductors 35D and 35E, respectively.

Diodes D20–D24 become connected in the ground path to one of the conductors A1, A2 or AF whenever one or more of the initiating circuit conductors 35A-35E become open circuited, thereby increasing the potential at conductors A1, A2, or Af and at the bases of transistors Q14-Q16 which are individually connected to conductors A1, A2 and AF, respectively. Transistors Q14-Q16, which are normally non-conducting, have collectors connected to +V2′ and emitters commonly connected to conductor TP to the trigger input of the timing circuit 142 at pin 2. Transistor Q14 has base bias supplied from +V2′ over resistor R51 and the ground path provided to conductor A1 over resistor R45 conductor 35A and resistor R46 whereas transistors Q15 and Q16 have base bias supplied from +V2′ over resistors R52 and R53, respectively, and the ground paths provided to conductors A2 and AF over the initiating circuit 35 as indicated above.

Under normal conditions, that is when none of the alarm contacts S1–S3 are intact, the potential on conductor TP and thus at the trigger input (pin 2) of timing circuit 142 is of a value sufficient to enable timing circuit 142 to oscillate when power is applied.

Alarm Frequency Generation

The timing circuit 142 is connected to run as a free running oscillator. The frequency of oscillation and the duty cycle are accurately controlled by resistors R40 and R41 and the capacitor network comprised of capacitors C13–C16. The normal frequency F1 at 2140, is obtained when capacitors C15–C16 are ground at points 148 and 149, respectively. The potentials at points 148 and 149 are determined by the status of gates 143–146. Accordingly, whenever gate 143 is disabled, capacitor C15 will be disconnected from ground and whenever gates 145 and 146 are both disabled, capacitor C16 will be disconnected from ground.

The NAND gates 143–146 are controlled by the potentials on conductors A1, A2 and AF as determined by the initiating circuit 35. The conditions summarized in Table II, will be described in detail hereinafter.

TABLE II

| Status | Frequency | Status Timing Capacitor | Input Requirements |
|---|---|---|---|
| Normal | 2140Hz | $C15 \cdot C16$ | $A1 \cdot A2 \cdot AF$ |
| Alarm 1 (S1) | 2900Hz | $\overline{C15} \cdot \overline{C16}$ | $\overline{A1}$ |
| Alarm 2 (S2) | 2640Hz | $\overline{C15} \cdot C16$ | $A1 \cdot \overline{A2}$ |
| Alternate Function (AF) | 2310Hz | $C15 \cdot \overline{C16}$ | $A1 \cdot A2 \cdot \overline{AF}$ |

Assuming that conductors 35A–35E are intact and that all of the contact S1–S3 are open, a positive potential appears on conductors A1, A2 and AF representing normal conditions for the alarm 1, alarm 2, and alternate function contacts, respectively. Accordingly, gates 143 and 145 are enabled providing a ground potential at points 148 and 149 for one side of capacitors C15 and C16. Thus, all four capacitors C13–C16 are connected in the timing circuit for the astable 142.

Therefore, when power is applied to the response generator 74 over transistor Q13, as enabled by the decoder circuit 73, the astable circuit oscillates at frequency F1, 2140Hz, representing the normal condition, and the response frequency is extended over diode D18 and resistor R43 to the return side of the loop 24.

For the case when an alarm 1 condition is being provided, alarm contacts S1 are closed, shorting conductors 35A and 35B together, effectively shorting out resistor R46. Accordingly, conductor A1 is effectively at ground potential. When conductor A1 is at ground potential, gates 143 and 145 are disabled providing floating outputs representing logic 1 levels at points 148 and 149, disconnecting capacitors C15 and C16 from the timing circuit of the astable 142. Accordingly, the frequency of oscillation of the astable circuit 142 changes to frequency F4, 2900Hz as indicated in Table II.

For the condition where an alarm 2 indication is being provided, contacts S2 are closed shorting out resistor R48 such that the potential on conductor A2 is close to ground potential. When conductor A2 is at ground potential, gate 143 is disabled providing a floating output at point 148 to disconnect capacitor C15 from ground. Thus, for the alarm 2 condition, the astable circuit 142 generates a response signal at frequency F3, 2640Hz.

When an alternate function alarm is being provided, contacts AF are closed, short circuiting resistor R50 such that conductor AF is at approximately ground potential. When conductor AF is at ground potential, gate 145 is disabled providing a floating output at point 145, thereby disconnecting capacitor C16 from the timing circuit. Thus the frequency of oscillation of the astable circuit at frequency F2 or 2310 Hz as shown in Table II.

Priority Conditions

The logical operations of gates 143–146 furnish the desired priorities of assertive functions. Thus, assuming that contacts S3 and S2 are closed so that conductors AF and A2 are both at approximately ground potential, NAND gate 143 is disabled by the ground potential provided on conductor A2 providing a logic 1 level output at point 148 for disconnecting capacitor C15. In addition, gate 145 is disabled to provide a floating output at the output thereof. However, gate 146 is enabled by gate 144 at point 149. Thus, capacitor C16 remains grounded and the frequency of oscillation is determined by capacitors C13, C14 and C16, providing a frequency of 2640Hz indicating the alarm 2 condition. Consequently in the event that both an alarm 2 condition and an alternate function condition are provided simultaneously, a response signal representing the alarm 2 condition is transmitted.

Assuming on the other hand that conductors A1 and A2 are both approximately ground potential due to closure of the associated contacts S1 and S2 of the initiating circuit 35, then gate 143 is disabled providing a floating output for disconnecting capacitor C15. In addition, the ground level potential on conductor A1 also disables gates 145 and 146 so that a ground output is provided at point 149 to disconnect capacitor C16. Therefore, whenever both an alarm 1 and an alarm 2 condition exist simultaneously, the frequency of oscillation is 2900Hz to represent the alarm 1 condition.

It can also be shown that in the event that an alarm 1 and alternate function conditions exist simultaneously, the response frequency 2900Hz is generated.

Initiating Loop Supervision Priority

Resistors R54, R55 and diode D25 control the conductivity of transistor Q16 to establish a priority of transmission for an alarm condition or an open circuit or trouble condition in either the alarm 1 or alarm 2 circuits, conductors 35A–35C, over a trouble condition in the alternate function circuit, conductors 35D–35E.

Resistors R54 and R55 are connected in series between terminals 31-1 and 31-3. Diode D25 is connected between terminal 31-4 and the junction of resistors R54 and R55.

Whenever contacts S1 or S2 are closed, resistors R54 and R55, respectively, become connected in parallel with resistor R50 in the circuit path to ground for the base of transistor Q16, driving transistor Q16 toward cutoff. Under such conditions, even if an open circuit condition should exist in either conductor 35D or 35E of the alternate function loop, when either diode D23 or D24 becomes connected the ground circuit path for transistor Q16, the resultant increase in potential at the base of transistor Q16 is insufficient to permit transistor Q16 to inhibit operation of the astable circuit 142.

It is pointed out that while the alarm 1 or alarm 2 circuits can control the turnoff of transistor Q16, the alternate function circuit cannot control turnoff of transistors Q15.

RECEIVER

Figure 23:
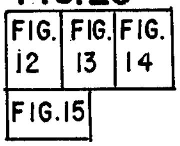
FIG. 23 shows how

FIGS. 12–15 when arranged as shown in FIG. 23 provide a schematic circuit diagram for the receiver 27. In addition, FIGS. 16A–16P show wave forms at various points in the receiver circuit 27.

Figure 12:
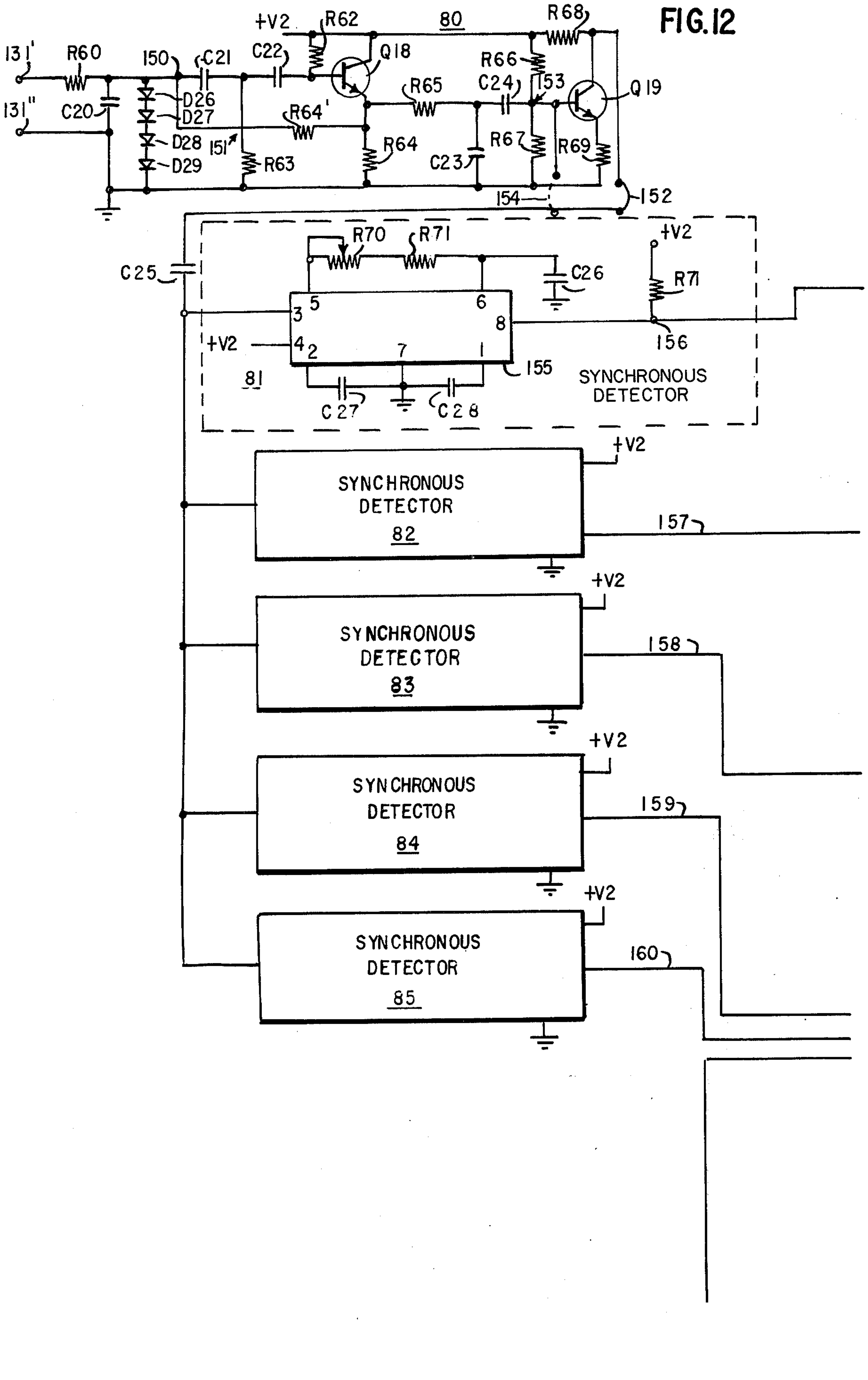
FIGS. 12–15 when arranged as shown in FIG. 23 provide a schematic circuit and partial block diagram for the receiver shown in block form in FIG. 4.

Referring first to FIG. 12, the input of the receiver 27 at terminal 131' is connected to the output of the address pulse generator 26 at terminal 131 shown in FIG. 9. The wave form of signals applied to input 131' is shown in FIGS. 16A. As can be seen in FIG. 16A, the signal input to the receiver 27 includes N + 1 address pulses 310 which define N + 1 time slots including time slots 300–304 indicated in FIG. 16A. The response signal provided by the address pulse generator 26 indicating the continuity condition of the transmission loop 24 is provided during the zeroeth time slot indicated at 300. The frequency response signals provided by zone status monitors 31–34 are provided during time slots 1–4 indicated at 301–304, respectively.

The signals input to the receiver 27 are extended over the preselector stage 80 to the input of the five signal detecting circuits 81–85. The preselector stage 80 includes diodes D26–D29 which are connected in series between a point 150 and ground. Point 150 is connected over a resistor R60 to input terminal 131'. A capacitor C20 is connected in parallel with diodes D26–D29. The power address pulses are clipped through diodes D26–D29 providing the wave form shown in FIG. 16B at point 150. The clipped signals provided at 150 are extended over a filter circuit 151 including capacitors C21, C22 and resistor R63 to the base of a transistor Q18. The base of transistor Q18, which is connected as an emitter follower amplifier, is also connected over a resistor R62 to +V2, and the collector of transistor Q18 is connected directly to +V2. The emitter of transistor Q18 is connected over a resistor R64 to ground and over a resistor R64' to a point 150. The output of the emitter follower stage at the emitter of transistor Q18 is connected over a resistor R65 and a capacitor C24 to the base of a transistor Q19 which is connected as an amplifier stage, which may have a gain of approximately four, for example. The base of transistor Q19 is connected over a resistor R66 to +V2 and over a resistor R67 to ground. The collector of transistor Q19 is connected over a resistor R68 to +V2 and the emitter of transistor Q19 is connected over a resistor R69 to ground. A capacitor C23 is connected between the junction of resistor R65 and capacitor C24 and ground. The output stage, including resistor R65 and capacitors C23 and C24 and transistor Q19, provide additional filtering and amplification of the signals provided by the emitter follower amplifier Q18. The output of the preselector stage 80 at the collector of transistor Q19 is extended over a link 152 and capacitor C25 to the inputs of frequency detector circuits 81–85. Alternatively, the output of the preselector stage 80 may be taken at point 153 at the base of transistor Q19 and extended over link 154 shown dotted in FIG. 12 and capacitor C25 to the inputs of the frequency detector circuits 81–85 providing a unity gain.

The frequency detector circuits 81–85 may comprise tone decoder phase locked loop circuits, such as the type SE–NE567 tone and frequency decoder commercially available from Signetics. The phase locked loop 155 normally provides an output at a first level at point 156 and provides an output at a second level whenever a sustained frequency within a preselected detection band is present at the input, pin 3, of the phase locked loop device 155. The band width center frequency, and output delay, are independently determined by external components including resistors R70–R71 and capacitors C26–C28. Variable resistor R70, which is connected between pins 5 and 6 of the device 155, and capacitor C26, which is connected between pin 6 of the device 155 and ground, serve as a frequency selection network to select a frequency at which the phase locked loop device 155 provides an output at the second level. Capacitor C27, which is connected between pin 2 of the device 155 and ground, serves as a low pass filter for the device 155, and capacitor C28, which is connected between pin 1 of the device and ground, serves as an output filter for the device 155. Pin 7 of the device 155 is connected to ground and pin 4 of the device 155 is connected to +V2. The output of the device 155 at pin 8 is extended to a point 156 which in turn is connected over a resistor R71 to +V2.

Phase locked loop detector 155 is tuned to detect frequencies in a range including the frequencies F1 and F2, 2140Hz and 2310Hz, of the response signals. Point 156 is normally maintained at +V2 volts over resistor R71. However, whenever response signals at a frequency of 2140BHz Hz 2310Hz are supplied to the input of the phase locked loop detector 155, the detector 155 provides a ground potential at point 156.

Frequency detector circuits 82-85 are similar to frequency detector circuit 81 and each may comprise a further phase locked loop device such as device 155. The phase locked loop circuits which comprise frequency detecting circuits 82–85 are tuned to accept frequencies F1–F4, respectively. Thus, frequency detector circuit 82 responds to response signals at a frequency 2140Hz, corresponding to the normal condition to provide a ground level output at point 57. Similarly, frequency detector circuits 83, 84 and 85 respond to signals at frequencies 2310Hz (alternate function), 2640Hz (alarm two condition), and 2900Hz (alarm one condition) to provide ground level outputs at point 158, 159 and 160, respectively.

Figure 13:
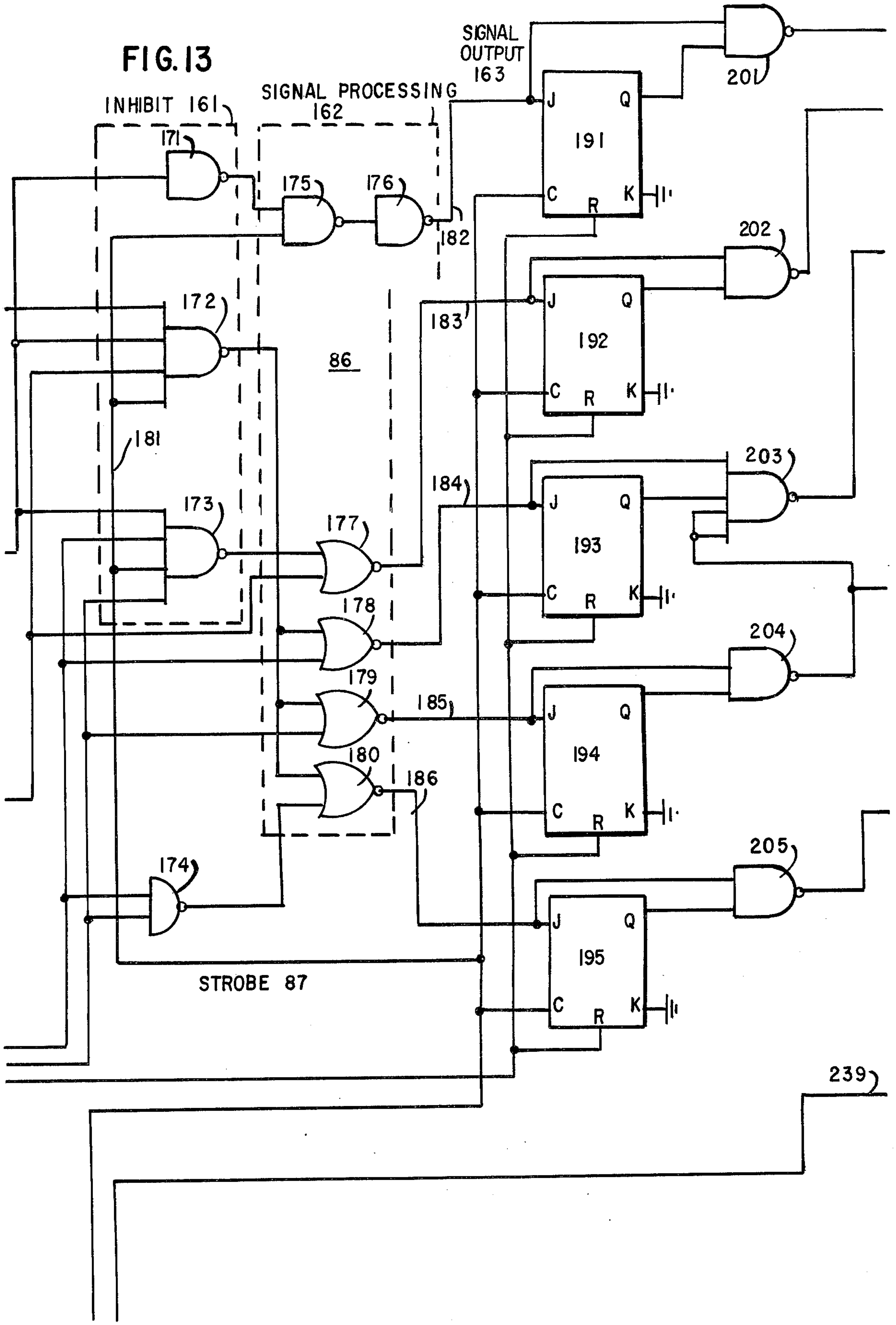

The outputs of the five phase locked synchronous detector loops 81–85 at points 156–160 are extended to the exclusivity detector circuits 86 shown in FIG. 13. The exclusivity circuits 86 include an inhibit stage 161, a signal processing stage 162 and a signal verification stage 163. The inhibit stage 161, including NAND gates 171–174 is responsive to outputs of the five phase locked synchronous detector loops 81–85 to develop signals for controlling the signal processing stage 162. Point 156 at the output of detector 81 is connected to an input of NAND gate 172. The output of detector 82 at point 157 is connected to an input of NAND gate 171 to a second input of NAND gate 172 and to a first input of NAND gate 173. The output of detector 83 at point 158 is connected to a third input of NAND gate 172 and the output of detector 84 at point 159 is connected to a second input of NAND gate 173 and a first input of NAND gate 174. The output of detector circuit 85 at point 160 is connected to a third input of NAND gate 173 and a second input of NAND gate 174. Fourth inputs of NAND gates 172 and 173 are connected over conductor 181 to the output of a strobe pulse generator 87 shown in FIG. 15.

The signal processing circuit 162 includes NAND gates 175 and 176 and NOR gates 177–180. NAND gate 175 has a first input connected to the output of gate 171 and a second input connected to receive the strobe pulse provided over conductor 181, The output of gate 175 is extended over NAND gate 176 which is connected as an inverter.

The output of NAND gate 173 of the inhibit stage 161 is connected to a first input of NOR gate 177. A second input of NOR gate 177 is connected to the output of frequency detector circuit 83 at point 159. The output of NAND gate 172 is connected to first inputs of NOR gates 178, 179 and 180. NOR gates 178 and 179 have second inputs connected to outputs of frequency detector circuits 84 and 85 at points 159 and 160, respectively. NOR gate 180 has a second input connected to the output of NAND gate 174. The signal processing stage 162 has five outputs 182–186 at the outputs of gates 176–180, respectively only one of which can be true at a given time. An output is provided at point 182, 183, 184, or 185 whenever a response frequency F1, F2, F3, or F4, respectively, is received. An output is provided at point 186, to represent a transmission error, whenever there is a lack of an acceptable frequency or whenever more than one response frequency is provided during a given time slot.

The five outputs at points 182–186 provided by the signal processing stage 162 are extended to inputs of the signal verification stage 163 which is comprised of five JK flip-flops 191–195 and associated NAND gates 201–205. Each of the JK flip-flops 191–195 has a J input individually connected to a different one of the output points 182–186 of the signal processing circuit 162, and a K input connected to ground. Clock inputs C of the JK flip-flops 191–195 are connected to the output of the strobe pulse generator 87. The positive outputs Q of the JK flip-flops 191–195 are individually connected to a first input of a corresponding NAND gate 201–205, respectively. NAND gates 201–205 each have a second input individually connected to a different one of the outputs 182–186 of the signal processing circuit 162. In addition, NAND gate 203 has a further input connected to the output of NAND gate 204.

The processing of signals through the inhibit circuit 161, signal processing circuit 162, and signal verification stages 163 are controlled by strobe pulses provided by the strobe pulse generator 87 which provides two strobe pulses at different predetermined times during each time slot. The output state of the frequency detector circuits 81–85 as provided at points 182–186 at the output of the signal processing circuit 162 is stored in the corresponding flip-flops 191–195 during the first strobe and is NANDed with the output state during the second strobe over gates 201–205. If that state is consistent during both strobes, an output pulse is available at the outputs of one of the NAND gates 201–205 for that time slot.

Figure 15:
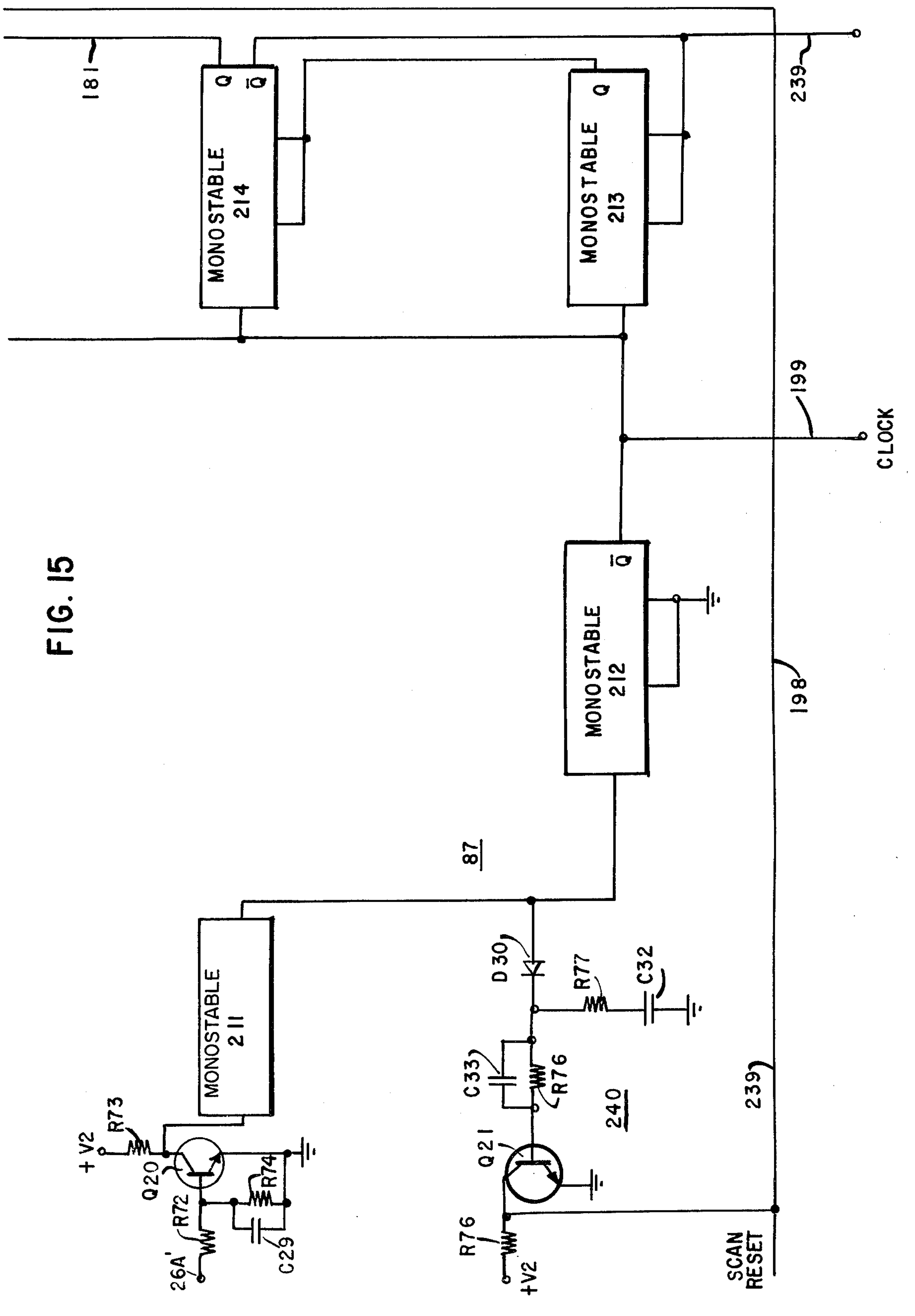
Figures 16A, 16B, 16C, 16D, 16E, 16F, 16G, 16H, 16I, 16J, 16K, 16L, 16M, 16N, 16O, 16P:
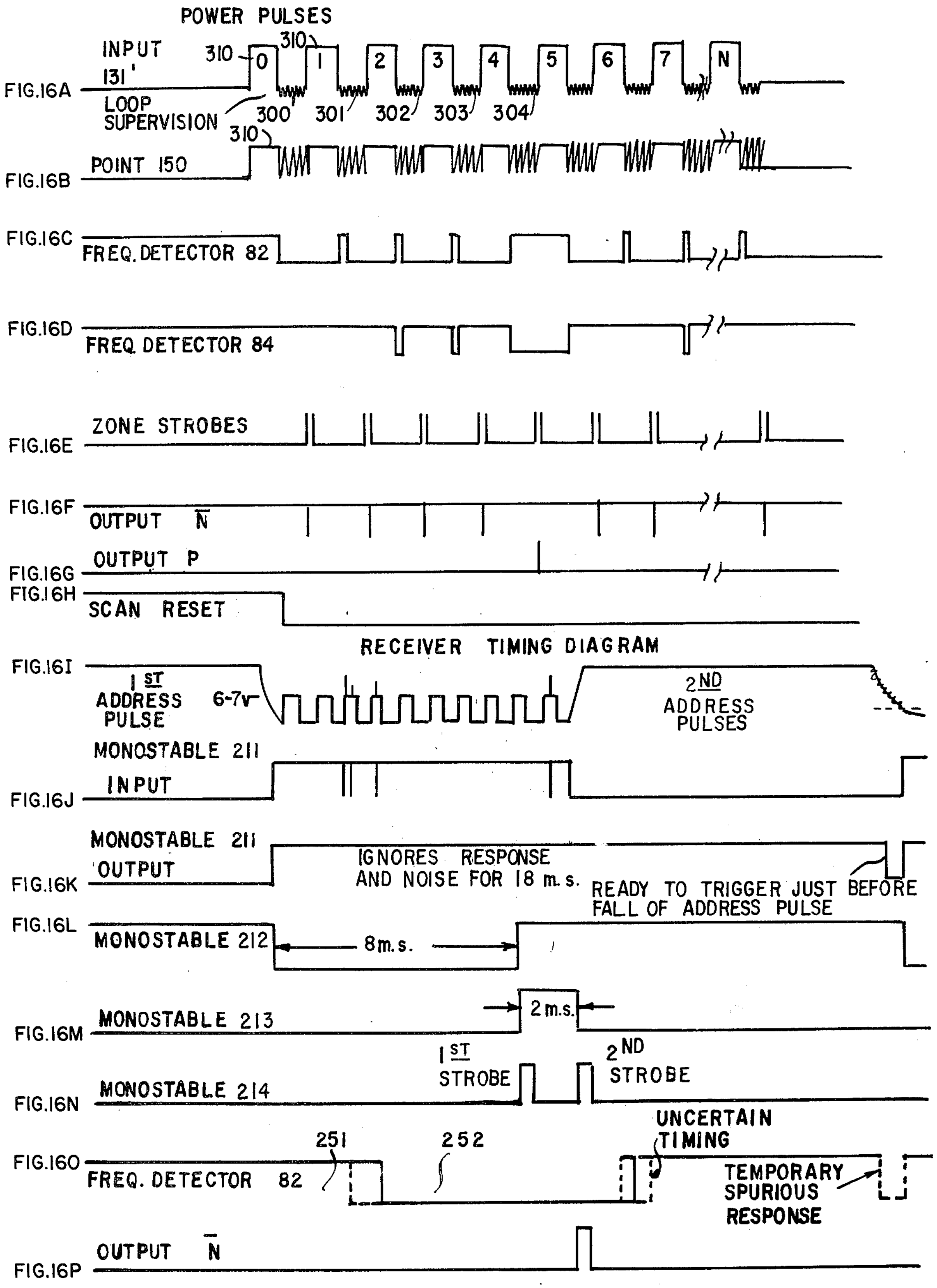
FIGS. 16A–16P (is a timing chart) show(ing) the relationships of signals at various points in the receiver circuit shown in FIGS. 12–15.

Referring to FIG. 15, the strobe pulse generator 87 includes a transistor Q20 and a plurality of monostable circuits 211–214 each of which may be the type 74L121, commercially available from Texas Instruments.

Transistor Q20 has a base connected over resistor R72 to a terminal 26A′ which in turn is connected to terminal 26A, FIG. 7, which connects to the positive conductor 24A at the return side of the loop 24. The base of transistor Q20 is also connected over parallel connected capacitor C29 and resistor R74 to ground. The collector of transistors connected over a resistor R73 to +V2 and the emitter of transistor Q20 is connected to ground. The collector of transistor Q20 is also connected to the set input of monostable circuit 211.

Transistor Q20, which is normally non-conducting, follows the address pulses received over conductor 24C and serves to inhibit the operation of monostable circuit 211 for the duration of the power pulse. At the end of each power pulse, transistor Q20 enables monostable circuit 211 which effects enabling of monostable circuits 212-214.

Monostable circuit 212 has a set input connected to the output of monostable circuit 211 and its negative output $\overline{Q}$ connected to set inputs of monostable circuits 213 and 214. Monostable circuit 212 is operable to delay the generation of the strobe pulses until a time near the end of each time slot. Monostable circuit 214 is enabled by monostable circuit 212 after a delay determined by monostable circuit 212 to provide a first strobe pulse, the width of which is determined by monostable circuit 214. Monostable circuit 213 is also enabled by monostable circuit 212 at the time monostable circuit 214 is enabled, and after a delay established by monostable circuit 213, monostable circuit 214 will again be enabled by providing a second pulse. Thus, monostable circuit 214 determines the width of the strobe pulses and monostable circuit 213 determines the spacing between the pulses.

Figure 14:
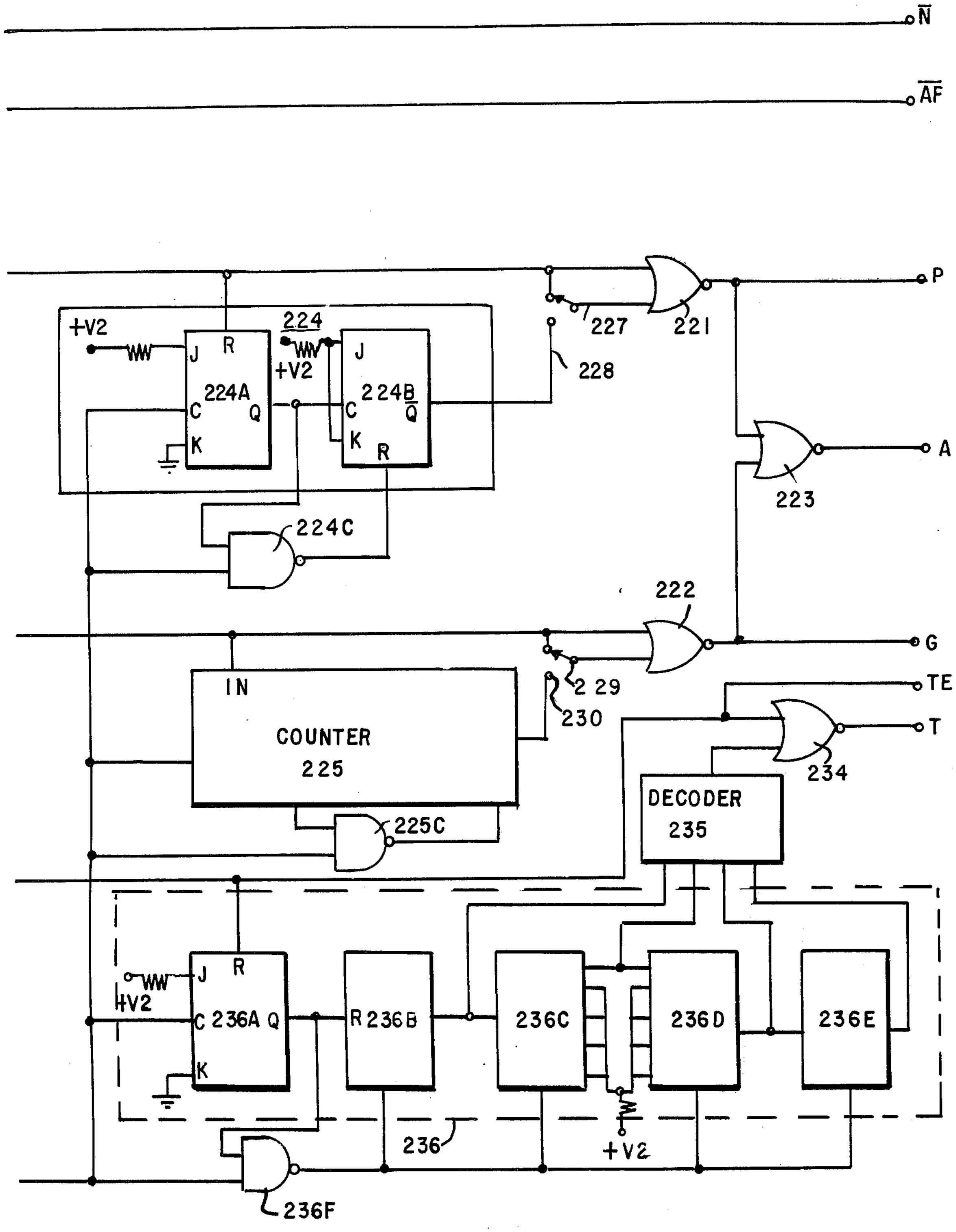

Referring to FIGS. 13 and 14, the output of gate 201 which represents a normal condition is extended to terminal $\overline{N}$. The output of gate 202 which represents an alternate function indication is extended to terminal $\overline{AF}$. The outputs of gates 203 and 204, which represent alarm two and alarm one conditions, respectively, are extended over NOR gates 221 and 222, respectively, to terminals P and G, respectively. Second inputs of NOR gates 221 and 222 are connected to outputs of counter circuits 224 and 225, respectively. The conductivity of gate 221 may be programmed to output an alarm pulse either the first time an alarm output is provided by gate 203 or only if the same alarm pulse existed in the preceding frame. To output a pulse each time gate 203 is enabled, a second input of NOR gate 221 at terminal 227 is connected directly to terminal 226 which is connected to the output of gate 203. On the other hand, to permit gate 221 to be enabled after a preselected number of alarm outputs have been provided by gate 203, input 227 of gate 221 is connected to terminal 228 at the output of the counter circuit 224. The input of the counter circuit is connected to the output of gate 203 and will thus count each alarm output provided by gate 203. When the number of alarm outputs reaches the count set by counter 224, NOR gate 221 will be enabled to provide an output at terminal P.

Similarly, NOR gate 222 may be controlled by a counter 225 to output an alarm at terminal G only after a predetermined number of alarm pulses have been provided by gate 204 which is connected to an input of the counter 225. In the exemplary embodiment, NOR gates 221 and 222 are shown connected to be responsive to a single output provided by gates 203 and 204, respectively, to provide outputs at terminals P or G, respectively. The outputs of NOR gates 221 and 222 are connected over a further NOR gate 223 which provides an alarm output at terminal A whenever an alarm one or an alarm two condition is indicated.

The output of gate 205, which indicates a transmission error, is extended to a terminal TE. In addition, the output of gate 205 is extended over a NOR gate 234 which has a second input connected to an output of a decoder circuit 235. The decoder circuit 235 is operable to decode the count of a counter 236 which has an input connected to the output of gate 205 to output trouble pulses only after a programmable number of frames are counted, each with a trouble in some zone, but not necessarily the same zone. Gate 234 when enabled will provide an output at terminal T indicating that a trouble indication has been received for the programmable number of times. Through the use of counters 224, 225 and 236, the receiver avoids the generation of false alarms and false troubles indications that might be generated intermittently within the receiver or by response of the receiver to radio signals, electric storms, etc.

The counter circuits 224, 225 and 236 are reset by a scan reset signal provided over conductor 239 by a scan reset circuit 240 shown in FIG. 15. The scan reset circuit 240 includes transistor Q21 which is controlled by the output of monostable circuit 211 to ground scan reset line 239 whenever monostable circuit 211 is enabled. The output of monostable circuit 211 is connected over a diode D30 and a resistor R76 to the base of transistor Q21. The junction of resistor R76 and diode D30 is connected to ground over a resistor R77 and a capacitor C32. A further capacitor C33 is connected in parallel with resistor R76. The collector of transistor Q21 is connected to +V2 over a resistor R78 and the emitter of transistor Q21 is connected to ground. Transistor Q21 is normally non-conducting and accordingly the scan reset line 239 is normally at a positive potential. Whenever monostable circuit 211 is enabled transistor Q21 is turned on grounding scan reset line 239 during the active part of the time frame. The scan reset circuit 240 is operable at the end of each time frame to effect resetting of the counters 224, 225 and 236 at the end of each time frame.

OPERATION OF RECEIVER CIRCUIT

The operation of the receiver circuit 27 shown in FIGS. 12–15 will now be described with reference to timing diagrams shown in FIGS. 16A–16P. FIG. 16A shows the wave form for pulses extended to input 131′ of the receiver 27 during a given frame. During the zeroeth time slot indicated at 300 which immediately follows the zeroeth address pulse, the continuity of the transition loop 24 is tested and the address pulse generator 26 provides a response indicative of continuity or lack of continuity in the transmission loop 24.

During the remaining time slots, such as time slots 301–304 indicated in FIG. 16A, the zone status monitor circuits are responsive to corresponding address pulses to provide a frequency response during the time immediately following its corresponding address pulse and before the next succeeding address pulse is provided. Thus, for example, zone status monitor circuits 31–34 provide responses during the first through fourth time slots indicated at 301–304, respectively, in FIG. 16A. For purposes of illustration, it is assumed that there are no open circuit conditions in the transmission line such that the address pulse generator provides a response frequency at frequency F1 during the zeroeth time slot. In addition, it is assumed that known status monitor circuits 31—33 are indicating normal conditions and are thus transmitting frequency F1 during corresponding time slots 301–303 and that zone status monitoring circuit 34 is providing an alarm two condition and is transmitting a response signal at frequency F3 during the fourth time slot 304.

The address pulse and reply signals transmitted over the transmission loop 24 are passed over the address pulse generator to terminal 131′ clipped by the diodes D26–D29 providing the wave form shown in FIG. 16B at point 150. The resultant signals are passed over the active filter circuit including filter network 151 and transistor Q18 which separates the response frequencies from the address pulses and any noise signals which may be present and extends the response signals over output stage Q19 and capacitor C25 to the inputs of the frequency detector circuits 81–85.

In the present example where it is assumed there is continuity in the transmission loop 24, the tone burst received during the zero time slot will be at the normal frequency F1. Each of the frequency detecting circuits 81–85 normally provides a positive output at points 156–160, respectively. The outputs of frequency detector circuits 82 and 84 are shown in FIG. 16C and 16D, respectively.

With the receipt of the response signal at frequency F1, frequency detector circuit 82 responds to such signal to provide a ground level output at point 157 as indicated in FIG. 16C. It is pointed out that frequency detecting circuit 81, which is tuned to detect both the normal frequency F1 and the alternate frequency F2, also provides a ground level output at point 156. The output of frequency detector circuit 82 at point 157 is extended over gate 171 to provide an enabling signal at a first input of gate 175.

Referring to FIG. 15 and the signal wave forms shown in FIGS. 16I–16P, when the zeroeth address pulse is provided transistor Q20 is turned on providing a ground level signal at the input of monostable circuit 211 as indicated in FIG. 16J. At the end of the zeroeth address pulse, when the trailing edge of the zeroeth address pulse decreases to a level of approximately 6–7 volts as indicated in FIG. 16I, transistor Q20 is turned off enabling monostable circuit 211 to provide a positive going output as indicated in FIG. 16K. Monostable circuit 211, once triggered ignores further responses and noise for a period of approximately 18 milliseconds. Thus, although noise pulses, shown in FIG. 16J, may exist during the zeroeth time slot, such noise pulses will have no affect on the operation of monostable circuit 211.

When monostable circuit 211 is triggered, the output of monostable circuit 211 enables monostable circuit 212 which provides a ground level output shown in FIG. 16L. for a duration of approximately 8 milliseconds to delay the generation of the strobe pulses for such time.

After the 8 millisecond delay provided by monostable circuit 212, monostable circuits 213 and 214 are enabled providing the outputs shown in FIGS. 16M and 16N, respectively. Monostable circuit 214 provides the first strobe pulse which is extended over conductor 181 to the exclusivity circuits 86 shown in FIG. 13. When monostable circuit 213 times out after approximately 2 milliseconds, monostable circuit 214 is again enabled to provide the second strobe pulse.

Referring to FIG. 16O, there is shown an enlarged view of a portion of the signal wave form for the output of the frequency detector 82 shown in FIG. 16C. When the response signal at frequency F1 is initially received at the input of the phase locked loop which comprises frequency detector circuit 82, the output of circuit 82 at point 157 remains high until the phase locked loop circuit locks to the normal frequency F2. The phase locked loop detector 82 may require a period, for example 4 to 5 milliseconds, before providing a ground level output indicated at 252 in FIG. 16O. However, as can be seen by comparing the wave forms shown in FIGS. 16L–16O, the monostable circuit 212 provides sufficient delay before the strobe pulses are generated to assure that the relevant phase locked loop is providing the proper output.

At the end of the zeroeth time slot, when the first zone address pulse is provided, as indicated in FIG. 16I, the input at monostable circuit 211 returns to ground level as transistor Q20 is again rendered conductive by the first address pulse. However, monostable circuit 211 does not time out until a time just preceding the end of the first address pulse as indicated in FIG. 16K. At such time, the output of monostable circuit 211 goes to a ground level and monostable circuit 211 is ready to trigger just before the fall of the address pulse. When monostable circuit 211 is triggered at the end of the second address pulse, monostable circuit 212 is again enabled to effect the generation of a pair of strobe pulses during the first time slot in the manner described above.

Referring to FIG. 13, when the first strobe pulse is provided during the zeroeth time slot, gate 175 is enabled to provide a signal over gate 176 to set flip-flop 191. When the second strobe pulse is provided, NAND gate 175 is again enabled, providing a signal over gate 176 to the input of NAND gate 201 which is enabled by the output of flip-flop 191 to provide a negative going output at terminal $\overline{N}$ as indicated in FIG. 16F. The output at pin $\overline{N}$ is extended to the printer 28, shown in FIG. 1, which decodes the output signal and controls the annunciator 29 to provide an indication of the continuity for the transmission loop during the instant interrogation cycle.

A similar sequence of events occurs for the first through third time slots wherein zone status monitor circuits 31–33 are providing response signals at frequency F1 indicating normal conditions. Accordingly, the outputs of frequency detecting circuit 82 are as shown in FIG. 16C, and, as strobe pulses are provided during each of the time slots, a negative going output is provided at terminal $\overline{n}$ as indicated at FIG. 16F.

During the fourth time slot, when the frequency response at frequency F3 is provided by zone status monitoring circuit 34, indicating an alarm two condition, frequency detector circuit 84 responds to provide a ground level output at point 159 as indicated in FIG. 16D. It is pointed out that the other frequency detecting circuits 81–83 and 85, such as frequency detecting circuit 82 may also respond initially to response frequency F3, providing temporary spurious outputs as shown in FIG. 16C in the fourth time slot, but only frequency detector circuit 84 provides a ground level output at the time the strobe pulses are provided by the strobe pulse generator 87.

The ground level output provided by frequency detecting circuit 84 is extended to an input of NOR gate 178 which has a second input connected to the output of NAND gate 172. NAND gate 172 has first through third inputs connected to outputs of frequency detecting circuits 81–83, respectively, which are providing logic one level outputs. Accordingly, when the first strobe pulse is provided during the fourth time slot, NAND gate 172 is enabled providing a logic zero input to NOR gate 187 which has a second input at logic zero level as provided by the output of frequency detecting circuit 84. Accordingly, NOR gate 178 is enabled to set flip-flop 193.

When the second strobe pulse is provided, NAND gate 172 enables NOR gate 178 which in turn enables NAND gate 203 to provide a signal indicating an alarm two condition which is extended over NOR gate 221 to terminal P providing the output shown in FIG. 16G. The output os NOR gate 221 is also extended over NOR gate 233 to terminal A for providing an alarm indication, representing either an alarm one or alarm two condition.

The alarm indications provided at terminals P and A are extended to the printer 28 which decodes the signals provided at terminals P and A and controls the annunciator 29 and alarm indicator 30, FIG. 1, to indicate that zone status monitor 34 is transmitting an alarm indication. It is pointed out that the strobe pulses provided by monostable circuit 214 shown in FIG. 15 are extended over conductor 239 to the printer 28 to permit synchronization of the operation of the printer with the address pulse generator to permit identification of the response data as it is received from each of the zones.

The reciever 27 processes the response signals provided by the remaining zones, determining the frequency of the response providing signals at points 156-160 at the output of the relevant frequency detector circuit 81–84, process such responses over the exclusivity and logic timing circuits 86, and provide outputs on the appropriate terminal or terminals, $\overline{N}$, $\overline{AF}$, P, A, G, TE or T in accordacne with the response received from each of the zones until N+1 address pulses have been transmitted. The receiver 27 thus processes the frequency responses serially into one of seven discrete functions, namely, normal condition, alternate function condition, alarm two or presignal alarm condition, alarm, alarm one or general alarm condition, transmission error, or trouble.

In the event that an alternate frequency function condition is being transmitted by one of the zone status monitoring circuits, frequency detecting circuit 83 is responsive to the response signal at frequency F2 to effect setting of flip-flop 192 over NOR gate 177 when the first strobe pulse is provided during the time slot for which the response signal at frequency F2 is received. The second strobe pulse effects enabling of NAND gate 202 to provide an output at terminal $\overline{AF}$. In addition, in the event that one of the zone status monitoring circuits is transmitting an alarm one condition, frequency detecting circuit 84 is responsive to the response signal at frequency F4 to effect enabling of flip-flop 194 over NOR gate 185 when the first strobe pulse is provided and to enable NAND gate 204 when the second strobe pulse is provided to provide an output indicating an alarm one or general alarm condition which is extended over NOR gate 222 to terminal G and over NOR gate 233 to terminal A.

In the event that none of the response signals F1–F4 are received during a given time slot, the outputs of frequency detector circuits 81–85 all remain high and when the first strobe pulse is provided, gates 172 and 174 are enabled enabling NOR gate 180 to set flip-flop 195. When the second strobe pulse is provided, NAND gate 205 is enabled to provide an output indicating a transition error which is extended to terminal TE. The transmission error indication is provided at terminal TE the first time a transmission error is detected. A trouble indication is indicated by outputting two trouble pulses at terminal T after six successive scans each of which contains a trouble pulse. Alternatively, a trouble indication may be indicated by providind an output during the fourth of four successive scans, the eighth of eight and the sixteenth of sixteen.

When a lack of frequency or transmission error is being processed, to assure that it is truly a fault condition, the information is processed through counter 236 which counts the number of transmission error indications provided by gate 205 and provides inputs to decoder circuit 235 which controls the enabling of NOR gate 234 only after a programmed number of transmission error indications are provided for a preselected number of contiguous time frames. The decoder 235 is programmable to decode a count of the counter 236 such that the lack of frequency response must be detected two or up to 16 times for two or up to 16 contiguous time frames.

As indicated above, each off-normal or trouble indication may be forwarded to the printer as soon as such indication is processed by the receiver, or alternatively, only after such off-normal indication has been received for a predetermined number of successive scans through the use of counters 224, 225 and 236.

Referring to FIG. 14, counter 224 may include a pair of bistable stages 224A and 224B. The first stage 224A may comprise a JK flip flop used as a reset-set latch. Flip flop 224A has an input R connected to the output of NAND gate 203 and J and K inputs connected to logic 1 and logic 0, respectively. A clock input C of the flip flop 224A is connected to the scan reset lead 239. The Q output of the flip flop 224A is connected to a clock input C of the second stage 224B, which may be a JK flip flop connected for operation or a toggle flip flop. Flip flop 236B has J and K inputs connected to logic 1. An input R of the flip flop 224B, connected to the output of NAND gate 224C, enables the flip flop to be cleared. The Q output of flip flop 224B is connected to terminal 228, which in turn is connectible over switch 227 to an input of NOR gate 221.

It is pointed out that counter 225 is similar to counter 224. In addition, counter 236 includes input stages 236A and 236B which are similar to stages 224A and 224B of counter 224. Counter 236 also includes output stages 236C–236E which enable counter 236 to count up to sixteen trouble pulses before providing an output.

Considering counter 224, during a first frame, a logic 0 pulse (alarm indication) from NAND gate 203 sets flip flop 224A during some time slot, and further pulses in other time slots have no further effect.

A the end of the frame, the SCAN RESET signal is NANDED with the output of the flip flop 224A over gate 224C, providing an output which resets flip flop 224B only if the flip flop 224A has been set.

At the start of the next frame, the falling edge of the SCAN RESET signal sequentially removes the reset input from the flip flop 224B and resets the flip flop 224A. The output of flip flop 224A then falls, toggling the flip flop 224B.

During the second frame, the alarm pulse, in as many time slots as may be, are ANDED over NOR gate 221 with the output of the flip flop 224A and are extended to output terminal P.

Had there been no pulse in the first frame, both flip flops 224A, 224B would have remained reset, and pulses in the second frame would initiate the above sequence.

The trouble counter 236, of course, counts to fifteen (or programmably to lower counts, via decoder circuit 235) and then enables gate 234 to output a trouble indication at terminal T during the subsequent frame.

SECOND EMBODIMENT

Figure 18:
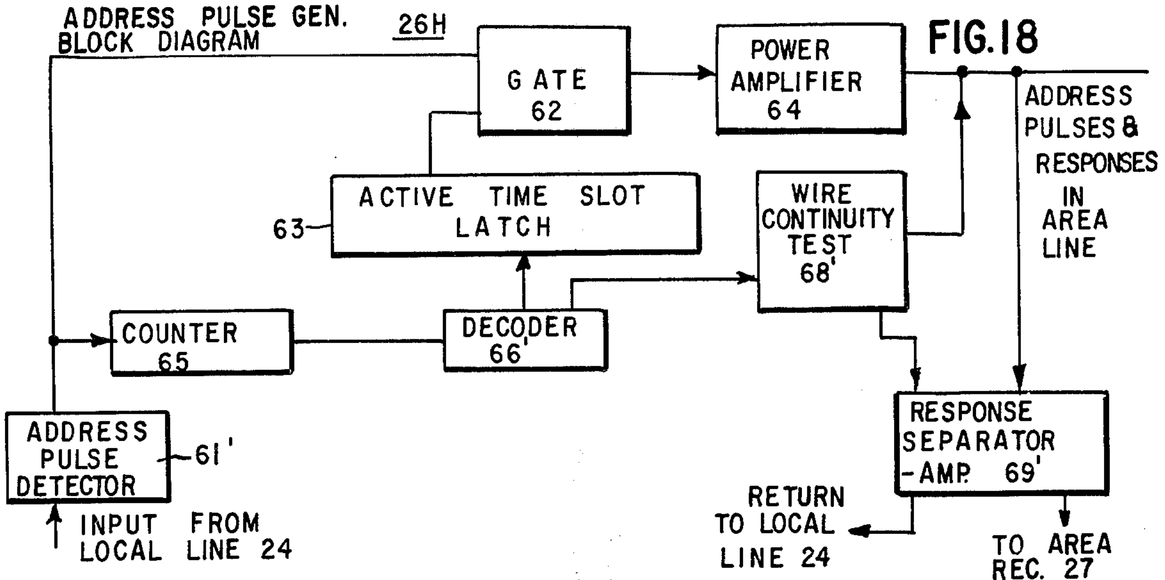
FIG. 18 is a block diagram of the area pulse generator employed in the system shown in FIG. 17.

Referring to FIG. 18, there is shown a block diagram for a second embodiment of a communication system 20′ provided by the present invention. The system 20′ shown in FIG. 18 includes a local control panel 25 having an address pulse generator 26 which supplies address pulses to a local loop 24 for effecting read out of information provided by a plurality of zone status monitoring circuits including zone status monitoring circuits 31K, 31H–33H, and 31L–34L. The local control panel 25 also includes a receiver 27 for receiving responses from the zone status monitoring circuits connected to transmission line 24. The address pulse generator 26 and the receiver 27 are identical with those shown in FIGS. 2 and 4, respectively. In addition, the zone status monitoring circuits 31K, 31H–33H, and 31L–34L are identical with zone status monitoring circuit 31 shown in FIG. 3.

The zone status monitoring circuits, such as zone status monitoring circuit 31K, may be connected directly in the local loop 24 in the manner described with reference to zone status monitoring circuit 31 in FIG. 1. In addition, groups of zone status monitoring circuits, such as zone status monitoring circuits 31H–33H and 31L–34L may be connected in an area loop 24H or 24L, respectively, and connected to the local loop 24 over corresponding area control panels 25H and 25L, respectively.

Figure 17:
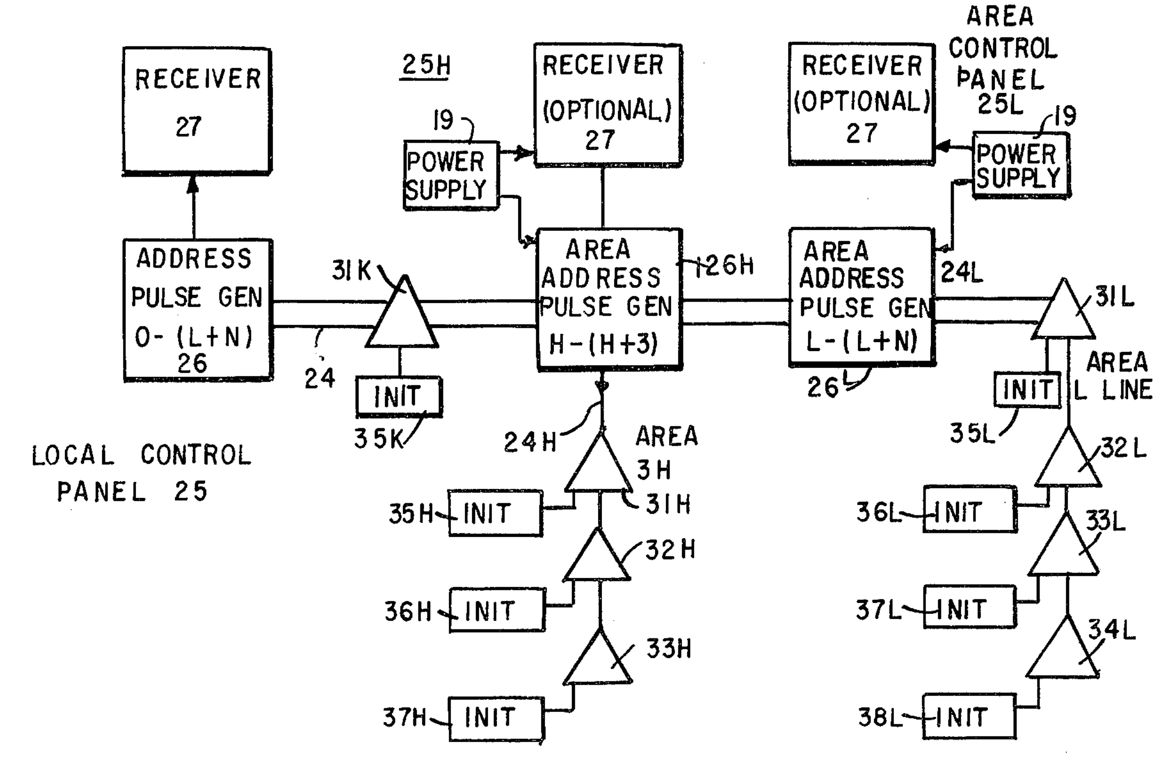
FIG. 17 is a block diagram representation of a second embodiment for a communication system provided by the present invention.

In the embodiment for the system 20′ shown in FIG. 17, wherein a number of zone status monitoring circuits, such as zone status monitoring circuits 31H–33H, are divided into groups with each group communicating with the central panel 25 over an area control panel 25H, the length of the transmission line 24 which comprises the local loop can be extended to an arbitrary limit of 10,000 feet. In addition, the system 20′ can accommodate up to 250 zones. Each area pulse generator adds up to thirty zone status monitors up to 250 combined areas and zones. The transmission line 24 may, for example, be a voice-grade telephone line and the response frequencies are chosen to be compatible with such line to enable the response signals to be transmitted among control panels without the use of modems.

The area control panel such as area control panel 25H is suitable for remote, unattended operation to serve for example one building of a campus, or one wing of a larger building.

Each area control panel, such as area control panel 25H, includes an area address pulse generator 26′ which controls the read out of an associated group of zone status monitoring circuits 31H–33H over an area loop 24H. The area address pulse generator 26′ counts out a block of the address pulses transmitted over the local loop 24 from the local control panel 25 and extends such pulses to the area loop 24H for effecting interrogation of the zone status monitoring circuits 31H–33H connected in the area loop 24H. The zeroeth zone of the area is used for area supervision to test the continuity of the area loop 24H and power is consumed by the zone status monitoring circuits 31H–33H only during the time area address pulses are provided by area address pulse generator 26′.

The area address pulse generator 26′ also relays responses from the zone status monitoring circuits 31H–33H connected to the area loop 24H to the local loop 24 for transmission to the local control panel 25.

The responses of the zone status monitoring circuits 31H–33H are also extended over the area address pulse generator 26′ to the receiver 27 if such receiver is provided at the area control panel 25H.

Figure 17A:
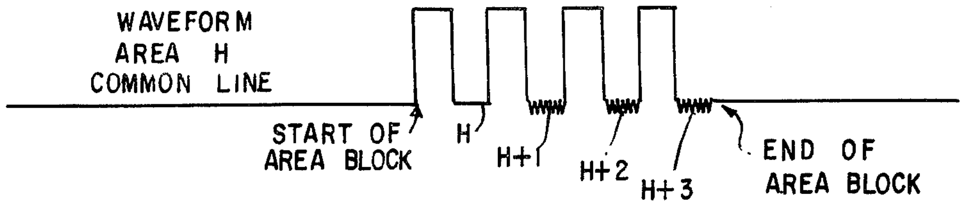
FIGS. 17A and 17B illustrate the wave forms of signals on the common line and the area line, respectively, for the system shown in FIG. 17.

A block diagram of the area address pulse generator 25H is shown in FIG. 18. The area address pulse generator 25H is generally similar to the address pulse generator 26 shown in FIG. 3. The area address pulse generator 26H differs from the local address pulse generator 26 in that instead of generating power address pulses, the area address pulse generator detects the power address pulses transmitted over the common line 24 and counts out a block of such address pulses and extends such pulses to the area line H. Thus, as shown in FIG. 18, the area address pulse generator 26H includes an address pulse detector 61′ which is connected to the local line 24 to receive the power address pulses transmitted over local line 24. The address pulse detector 61′ provides an output pulse for each power address pulse which is detected and extends such pulses over a gate 62, when gate 62 is enabled, to a power amplifier 64 which provides power address pulses for the area line 24H. The area address pulse generator 26H further includes an active time slot latch 63 and a counter 65 and decoder circuit 66′ which control the enabling of gate 62 to effect the generation of the number of address pulses for the area line 24H which are required to effect energization and read out of the zone status monitoring circuits 31H–33H connected to the area line 24H. The input of the counter 65 is connected to the output of the address pulse detector 61′ and counts the N + 1 address pulses transmitted over the local line 24. The decoder 66′ decodes a count of H for counter 65 and enables the active time slot latch 63 to in turn enable gate 62 to permit pulses from the output of the address pulse detector circuit 61′ to be gated to the power amplifier 64. In the present example, wherein zone H includes three zone status monitoring circuits 31H–33H, the active time slot latch circuit 63 is set to enable gate 62 to pass four pulses to the power amplifier circuit 64 such that four address pulses are transmitted over the area line 24H. The zeroeth address pulse of the area block effects energization of the zone status monitoring circuits 31H–33H and during the time slot H immediately following the zeroeth address pulse transmitted over area line 24H, the continuity of the area loop 24H will be tested by a wire continuity test circuit 68′ of the area address pulse generator 26′ which in turn controls a response amplifier 69′ to provide a response signal indicative of the condition of the area loop 24H. As the next three address pulses are extended to the area loop 24H, the status of initiating circuits 35H–37H associated with zone status monitoring circuits 31H–33H, respectively, is read out during time slots H + 1, H + 3, respectively, and transmitted over the area loop 24H to the area address pulse generator 26H and extended over the response amplifier 69′ to the local line 24. In addition, the zone responses may also be extended to an area receiver 27. The waveform for the signals transmitted over the area loop 24H is shown in FIG. 17A. It is to be understood that the waveforms shown in FIG. 17A are simplified and that the waveform for the power pulses is as shown in FIG. 5.

Area address pulse generator 26L is operable in a manner similar to area address pulse generator 26H to count out a block of address pulses L–(L + M) of the address pulses transmitted over the local loop 24. Area address pulse generator 26L effects the continuity test of the area line 24L during the first time slot L of the block of address pulses counted out by address pulse generator 26L and effects sequential readout of the zone status monitoring circuits 31L–34L connected to the area loop 24L. The responses provided by zone status monitoring circuits 31L–34L are transmitted over the area loop 24L to the area address pulse generator 26L and extended to the local loop 24 and to the receiver 27.

Figure 17B:
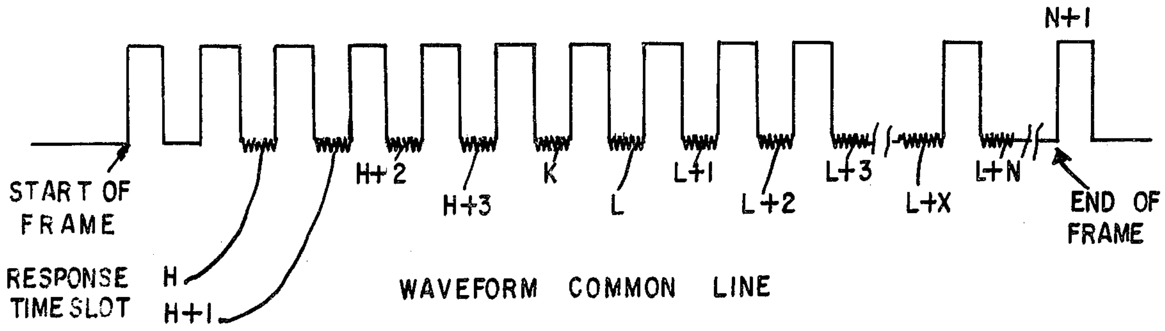

Thus, the waveform for signals transmitted over the local loop, as shown in FIG. 17B, is comprised of N + 1 address pulses which provides N + 1 time slots. During the zeroeth time slot, after the zeroeth address pulse, the continuity of the local loop 24 is tested by the area address pulse generator 26. Thereafter, during time slots H through H + 3, responses indicative of the continuity of area loop 24H and the information provided by zone status monitoring circuits 31H–33H is transmitted. During time slot K, the information provided by zone status monitoring circuit 31K which is connected directly to the local line 24 is provided, and during time slots L through L + M, the responses of the zone status monitoring circuits, including zone status monitoring circuits 31L–34L connected to the local loop 24L is provided. The serial response data transmitted over the local line 24 is extended over the address pulse generator 26 at the local control panel 25 to the receiver 27 which decodes and processes the responses from the various zones.

DETAILED DESCRIPTION OF AREA PULSE GENERATOR

Figure 19:
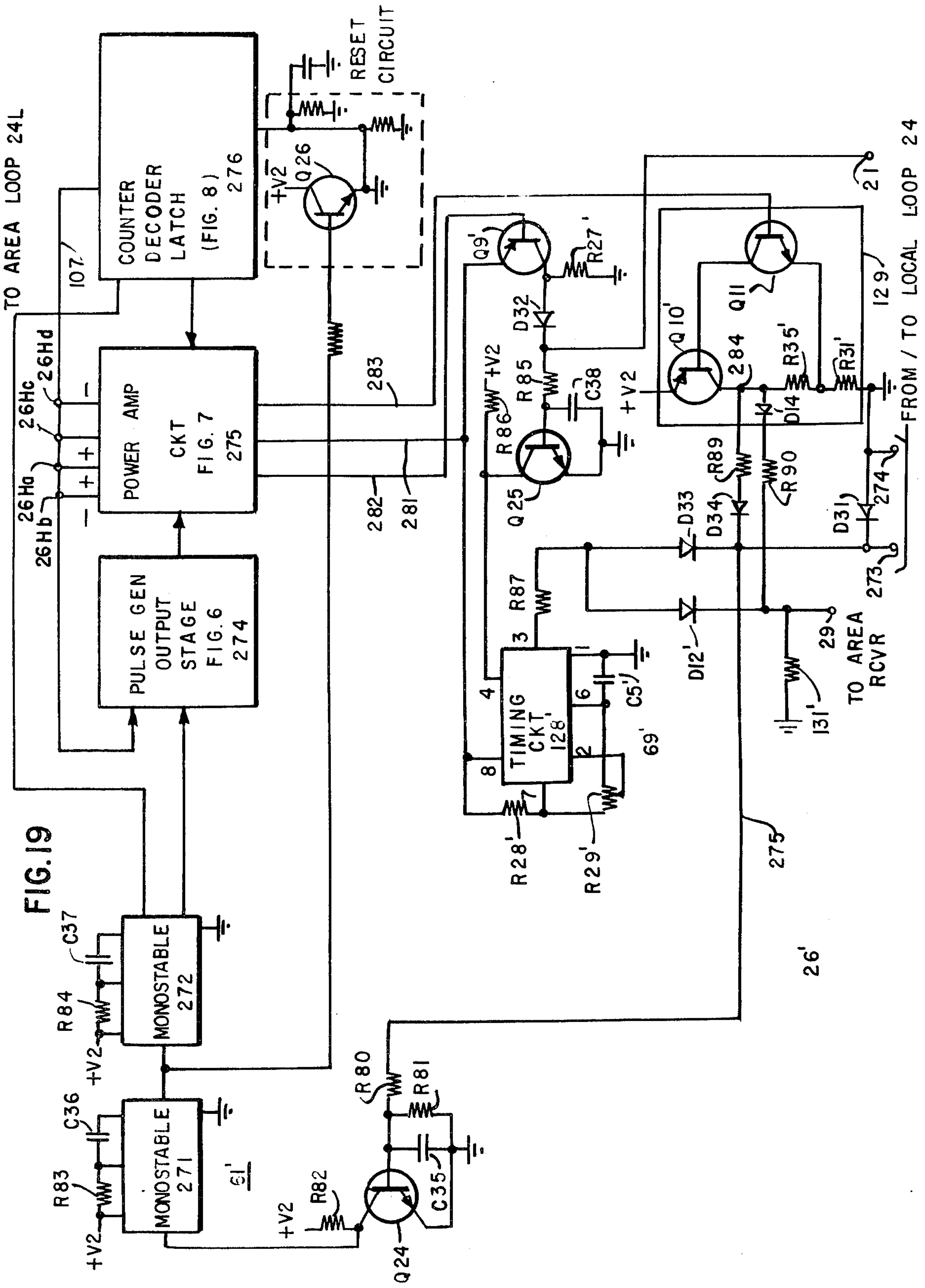
FIG. 19 is a schematic circuit and partial block diagram of the area address pulse generator shown in FIG. 18.

Referring to FIG. 19 there is shown a schematic circuit and partial block diagram of the area address pulse generator 26H. Portions of the area address pulse generator 26H include circuits which are identical with those of the local address pulse generator 26 shown in FIGS. 6–9. Such portions, shown in block form in FIG. 19, are included within the dotted lines shown in FIGS. 6–8, and will not be described in detail.

The pulse detecting circuit 61′ includes transistor Q24 and monostable circuits 271 and 272 which may be the type 74L121, commercially available from Texas Instruments. Monostable circuits 271 and 272 have external components including resistor R83, capacitor C36 and resistor R84, and capacitor C37, respectively, which determine the response period for monostable circuits 271, 272, respectively.

The area addresss pulse generator 26H is connected to the positive and negative conductors 24A and 24B of the local loop 24 over terminals 273 and 274, respectively. Terminal 273 is connected over a resistor R70 to the base of transistor Q24. The base of transistor Q24 is also connected to ground over parallel connected resistor R81 and capacitor C35. The emitter of transistor Q24 is connected to ground and the collector of transistor Q24 is connected over a resistor R82 to +V2 and to the input of monostable circuit 271 which has an output connected to an input of monostable circuit 272.

Transistor Q24 and monostable circuit 271 are operable in a manner similar to transistor Q20 and monostable circuit 211 of the strobe pulse generating circuit 87 shown in FIG. 15. Transistor Q24 is normally non-conducting and thus the input of monostable circuit 271 is normally held at approximately +V2 potential. As each address pulse is received from the local loop, transistor Q24 is rendered conductive providing a ground potential at the input of monostable 271 maintaining the output of monostable circuit 271 low. As has been described above with reference to the strobe pulse generating circuit 87 at the end of the address pulse, when the trailing edge of the address pulse falls below a predetermined threshold value, a transistor Q24 is cut off, triggering monostable circuit 271 which provides an output for triggering monostable circuit 272. The monostable circuit 271, once triggered, provides an output of a predetermined duration, such as 18 milliseconds, as determined by resistor R83 and capacitor C36 and is not responsive to further input trigger signals as may be provided by transistor Q24 as a result of noise on the local loop 24 until monostable circuit 271 times out.

Monostable circuit 272 when triggered by monostable circuit 271 provides an output pulse of a duration which is determined by resistor R84 and capacitor C37, and may for example be nine milliseconds. The output of monostable circuit 272 is extended to block 274 which includes gating circuit 62 and in particular operational amplifier 106 which is responsive to each pulse provided by monostable 272 to provide a trapezoidal-shaped address pulse of the type shown in FIG. 5. The address pulses thus provided are extended over the power amplifier circuit which comprises block 275, including transistors Q2–Q4 shown in FIG. 7. The power address pulses thus provided are applied to the area loop 24L over terminals **26H*a*–26H*d* of the area address pulse generator circuit 26H.**

The output of monostable circuit 272 is also extended to block 276 which comprises the counter 65, decoder circuit 66' and active time slot latch circuit 63 which are similar to counter 65, decoder circuit 66 and latch circuit 63 shown in FIG. 8. However, in the area address pulse generator 26H, NAND gate 116 of the decoder circuit 66' is connected to decode a count of H for counter 65 and NAND gate 117 is connected to decode a count of H + 3.

Accordingly, when the counter 65 reaches a count of H, gate circuit 62 is enabled over conductor 107 to gate pulses provided by monostable circuit 272 to the power amplifier 64 and thence to the area loop 24L. Also at a count of H, transistor Q8, shown in FIG. 7, is enabled to apply supervisory current to the area loop 24H during the time slot H. The line test continuity circuit including transistors Q5 and Q6 shown in FIG. 7 which form a portion of block 275 control the response generator 69'. The response generator 69' includes a timing circuit 128' which is similar to timing circuit 128 shown in FIG. 9. Timing circuit 128' may comprise the type NE555V timing circuit commercially available from Signetics, which is connected for operation as an astable multivibrator. The timing circuit 128' includes external components including resistors R28' and R29' and a capacitor C5', which set the trigger level for timing circuit 128' and determine the frequency of oscillation. The timing circuit 128' is triggered into oscillation when an enabling signal at + V2 is extended to pin 8 of the timing circuit 128' over conductor 281 whenever transistor Q8, FIG. 7, is enabled.

Transistors Q9' and Q25 provide an inhibit circuit for the timing circuit 128' in the event that a lack of continuity is detected in the area loop 24H by transistors Q5 and Q6 of the continuity test circuit 68'. Transistor Q9' has a base connected over conductor 282 to the output of the continuity test circuit at point 126 shown in FIG. 7. The emitter of transistor Q9' is connected to conductor 281 to receive + V2 potential whenever transistor Q8 is turned on during the line continuity test sequence. The collector of transistor Q9' is connected over a resistor R27' to ground and over a diode D32 and a resistor R85 to the base of transistor Q25. The base of transistor Q25 is also connected to ground over a capacitor C38. The emitter of transistor Q25 is connected to ground and the collector of transistor Q25 is connected to + V2 over a resistor R86. The collector of transistor Q25 is also connected to a reset input of the timing circuit at pin 4. Transistor Q9' and Q25 are normally cut off. In the event there is a lack of continuity in the area loop 24H, a ground potential provided on conductor 281 by either transistor Q5 or Q6 causes transistor Q9' to turn on which in turn causes transistor Q25 to turn on providing a ground at pin 4 of the timing circuit 128', preventing oscillation.

Timing circuit 128' is operable when energized to oscillate at a frequency F1, which is the normal frequency, providing an output at pin 3 which is extended over a resistor R87 and a diode D33 to the local loop over terminal 273. The output of the timing circuit is also extended over diode D121 to the area receiver.

The response circuit 69' also includes an amplifier circuit 129 which is identical to amplifier circuit 129 shown in FIG. 9 comprised of transistors Q10 and Q11 which receives responses received from the area loop 24H over terminal 24HC and extended over conductor 283 to the amplifier 129. The output of the amplifier at point 284 is extended over a resistor R90 to the area receiver and over a resistor R89 and diode D34 to the terminal 273 which is connected to the local loop 24.

THIRD EMBODIMENT

Figure 20:
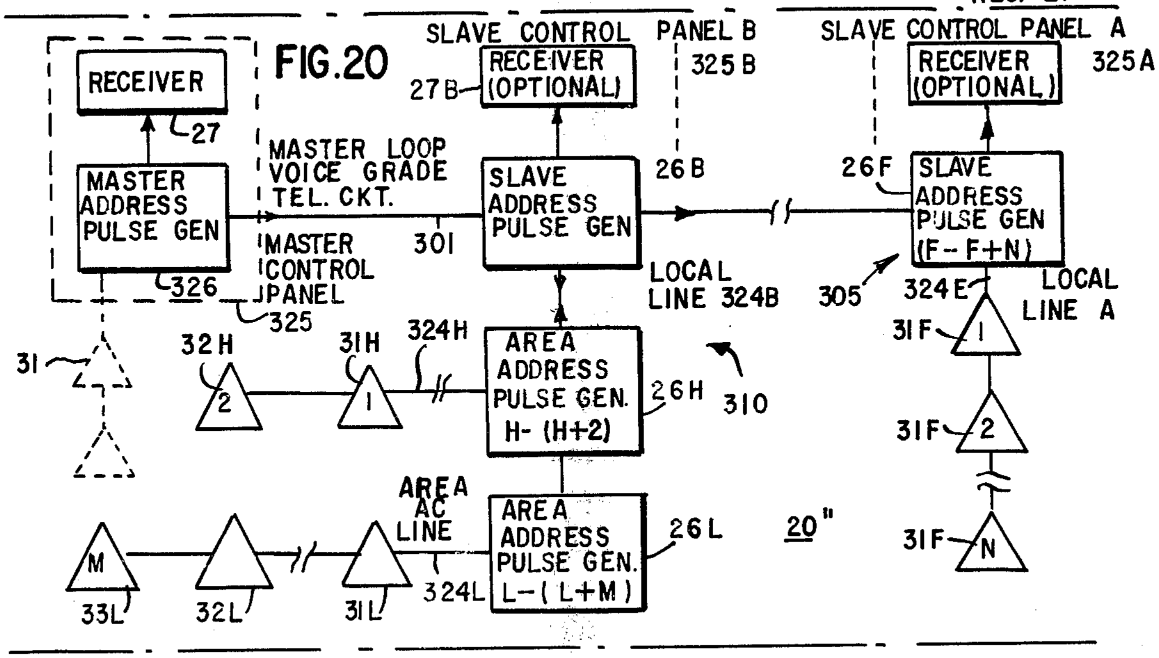
FIG. 20 is a block diagram representation of a third embodiment of a communication system provided by the present invention.

Referring to FIG. 20, there is shown a block diagram of a third embodiment for a communication system 20'' provided by the present invention in which multiple control panels 325, 325A and 325B, which control readout of initiating devices in a plurality of zones, may communicate with one another over a master loop 301 which may comprise a voice grade telephone circuit, either metallic or carrier. One of the control panels, such as control panel 325, serves as a master control panel and the remaining control panels, such as control panels 325A and 325, are controlled by the master control panel 325. By the use of a master control panel 325 to control slave control panels 325A and 325B, which may be connected up to include as many as four master loops, the separation of the master control panel 325 from the farthest zone may be extended to an arbitrary limit of twenty miles. Each master and slave control panel can control up to 250 zones through area pulse generators, each controlling up to 30 zones or each master or slave panel can control 30 zones directly.

The portion of the communication system 20'' indicated at 305, including slave control panel 325A, is operable in a manner similar to communication system 20, shown in FIG. 1. Moreover, the portion of the communication system 20'' indicated at 310, including slave control panel 325B, is operable in a manner similar to communication system 20', shown in FIG. 17.

The master control panel 325 includes a master address pulse generator 326 which generates a sync carrier signal for transmission over the master loop 301 to the locations of the slave control panels 325A and 325B for synchronizing the operation of the slave control panels 325A and 325B. The sync carrier signal is at a frequency which is convenient multiple, for example, of the time slot rate. The master address pulse generator 326 may also supply address pulses for address and power to local zone status monitors, such as zone status monitor 31 shown in FIG. 20, and for clocking an associated receiver 27.

Slave control panels 325A and 325B include slave address pulse generators 326F and 326B, respectively, which are generally similar to address pulse generator 26 shown in FIG. 2 but include sync pulse detector circuits.

Slave address pulse generator 326F responds to the sync signal provided by the master address pulse generator 326, divide the sync time by sixteen to obtain the address pulse rate, which they count up to programmed first and last local zones. The slave address pulse generators generate a block of address pulses during assigned time slots to control the readout of associated zone status monitoring circuits 331F–333F which are connected in a local loop 324F with slave address pulse generator 326F and which provide responses during the time slots defined by such address pulses.

Similarly, slave address pulse generator 326B, is responsive to the sync signal to generate a further block of address pulses during different time slots to provide address pulses for controlling area address pulse generators 326H and 326L which are connected in a local loop 324B with slave address pulse generator 326B. Area address pulse generator 326H in turn controls the readout of associated zone status monitoring circuits 331H–334H, which are connected in an area loop 324H with area address pulse generator 326H, and area address pulse 326L controls the readout of zone status monitoring circuits 331L–333L, which are connected in an area loop 324L with address pulse generator 326L, in the manner described in the foregoing for area address pulse generator 26′ shown in FIG. 17.

Zone status monitors 331F–333F, 331H–332H, and 331L–333L are identical to zone status monitor 331 shown in FIG. 3. Each of the zone status monitors 331F–333F, 331H–332H, and 331L–333L responds to a preprogrammed address pulse supplied by its associated slave or area address pulse generator to provide a reply signal at one of four frequencies F1–F4, in the manner set forth above.

The responses provided by zone status monitoring circuits 331F–333F are relayed over slave address pulse generator 326F to the master loop 301. The zone responses provided by zone status monitoring circuits 331H–332H and 331L–333L are relayed to slave address pulse generator 326B over corresponding area address pulse generators 326H and 326L, respectively, and thence to the master loop 301 for transmission to a receiver 327 at the master control panel 325. The slave control panels 325A and 325B may also have receivers 327A and 327B, respectively, to permit decoding and display of the status of associated initiating devices.

When the communication system 20″ is employed in a proprietary or central station protective signaling system, the sync pulse generator need not be located at the master control panel 325. Any one of the address pulse generators anywhere on the master loop 301 may be connected as the master address pulse generator.

Figure 20A:
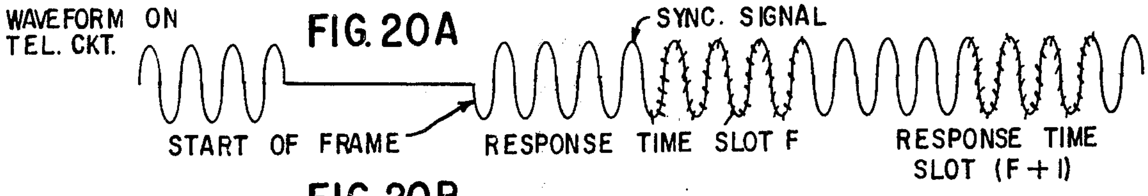
FIGS. 20A and 20B illustrate the wave forms of signals on the master line and the area line, respectively, for the system shown in FIG. 20.

In operation, the master address pulse generator 326 generates a sync signal, shown in FIG. 20A for transmission over the communication circuit 301 to the locations of the slave control panels 325A and 325B. The sync signal may, for example, have a frequency of 825Hz, exactly sixteen times the polling rate of the slave address pulse generators and high enough to avoid excessive delay error compared to the response frequencies. The start of each time frame is controlled by resumption of the sync signal after a brief interruption, for eight cycles, for example, as shown in FIG. 20A. Counters of the slave address pulse generators, such as counter 65, described above with reference to FIG. 2, are reset to zero at the beginning of each scan by the eight cycle interruption of the sync line.

Slave control panel 325A responds to the sync signal and generates a block of address pulses during time slots F through F + 3 for effecting readout of associated initiating devices 331F–333F, each of which responsively provides a reply signal at one of four frequencies F1–F4 during an assigned time slot. The wave form for signals appearing on local line 324F is shown in FIG. 20B.

During the zeroeth time slot, time slot F, the continuity of the local line 324F is supervised and a response indicating the condition of local line 324F is generated for transmission over the communication line 301 to the receiver 327 at the master control panel 325. As can be seen in FIG. 20A, the response provided by slave address pulse generator 326F modulates sync carrier signal to enable transmission of the response signal to the master control panel 325.

Figure 20B:
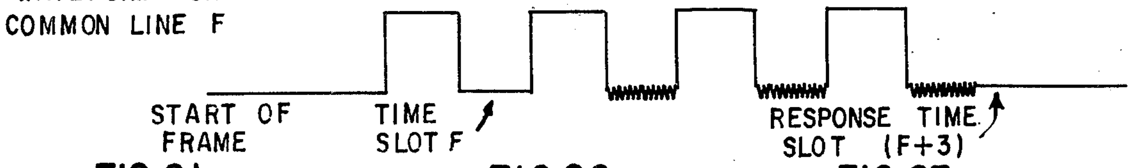

Thereafter, when the next three address pulses are provided during time slots F + 1 through F + 3, the zone status monitoring circuits 331F–333F are enabled to provide response signals on the local loop 324F as shown in FIG. 20B, which are relayed to the master loop 301 via slave address pulse generator 325A to modify portions of the sync signal appearing thereon through linear addition. The response signals are linearly added to portions of the sync signal.

Slave control panel 325B will be responsive to the sync signal to generate a block of address pulses during time slots G–(G+L+M) and to provide loop supervision and effect enabling of zone status monitors 331H–332H and 331L–333L during assigned time slots. Loop supervision for the local line 324H and 324L are provided during time slots H and L, respectively, and the readout of zone status monitoring devices 331H–332H and 331L–333L is provided during time slots H+1 and H+2, and L+1 through L+M, respectively.

Thus, the waveform for signals appearing on the master loop 301 (FIG. 20A is seen to contain two components, an almost continuous sync signal which maintains phase coherency but not actual presence between time frames and a train of responses separated in time by intervals about as long as the duration of one response. Exactness of the spacing may be expected to vary slightly according to exactness of synchronization and to line delays from the location of two particular zones to the point of observation. Amplitudes of the sync and various response signals may also be expected to vary with the distance involved.

Minor discrepancies of the above-described nature or even noise hits of a duration considered normal to the literature cannot have any effect on the signaling reliability because the significance of the signal is contained only in its frequency and also because of the equal repetition at short intervals.

The principal restriction on master loop 301 arises from relative attenuation of sync and response signals. In order that the sync signal may not be so much stronger as to capture the receiver 327, the master pulse generator 325 should be located within 20 miles of the most distant slave pulse generator. This limit depends partly on third harmonic distortion in the transmission system since the third harmonic of the sync frequency falls in between the supervisory and alarm frequencies of the responses.

It is pointed out that in the event of failure in the master loop 301, which would interrupt the sync signal, each of the slave address pulse generators 326A and 326B wait for a preselected interval for resumption of sync signals and then becomes operable in the manner of the systems shown in FIGS. 1 and 17, respectively. Whenever the slave control panels 26A and 26B are operating independently of the sync pulses, the responses are not relayed onto the master loop 301.

I claim:

1. In a communication system for reporting information from a plurality of remote locations to a control location over a common communication channel, monitoring means at each of said remote locations including signal generating means operable to provide an information signal representing the condition of at least one variable monitored by said monitoring means for transmission over said communication channel to said control location, the signal generating means of different monitoring means being operable to provide an information signal during a different preassigned time slot, and master control means at said control location, including means for generating a synchronizing signal for defining the time slots for said monitoring means, and at least one slave control means connected in a local loop with at least certain ones of said monitoring means, said slave control means being connected to said common communication channel to receive said synchronizing signal and to responsively provide a further synchronizing signal for transmission over said local loop for controlling the operation of said certain monitoring means.

2. A system as set forth in claim 1 wherein said master control means further includes receiver means for receiving the responses provided by all of said monitoring means.

3. A system as set forth in claim 2 wherein said slave control means includes receiver means for receiving the responses provided by all said monitoring means.

4. A system as set forth in claim 1 wherein said slave control means is normally controlled by the synchronizing signal provided by said master control means, said slave control means being operable to independently generate said further synchronizing signal in the event of interruption of the transmission of said synchronizing signal over said common communication channel.

5. In a communication system for reporting information from a plurality of remote locations to a control location over a common communication channel, a plurality of monitoring means each connected to said transmission line at a different one of said locations, means at one of said locations including address means having pulse generating means for generating a series of address pulses defining a time frame for transmission over said communication channel to said remote locations, the end of each of said address pulses defining the start of a time slot and the number of address pulses defining the number of time slots, and enabling means for controlling said pulse generating means to select the number of pulses in each time frame to provide a separate address pulse for each of said monitoring means to thereby define an individual response time slot for each monitoring means, each of said monitoring means, including response generating means and including pulse counting means for counting said address pulses and responsive to a predetermined number of said address pulses to enable the corresponding response generating means to provide a response signal representing the condition of at least one variable monitored by said monitoring means, the pulse counting means of different monitoring means being responsive to a different preselected number of said pulses of the series of address pulses to enable the corresponding response generating means to provide a response signal during a different preselected time slot for transmission over said communication channel to said one location.

6. In a communication system for reporting information from a plurality of remote locations to a control location over a common transmission line, a plurality of monitoring means each connected to said transmission line at a different one of said locations, control means connected to said transmission line at said control location and including address pulses generator means having pulse generating means for generating a series of address pulses defining a time frame for transmission over said transmission line to each of said monitoring means at said remote locations, the end of each address pulse defining the start of a time slot and the number of address pulses defining the number of time slots, and enabling means for controlling said pulse generating means to select the number of pulses in each time frame to provide a separate address pulse for each of said monitoring means to thereby define an individual response time slot for each monitoring means, each of said monitoring means including response generating means operable when enabled to provide a response signal for transmission over said transmission line to said control location, and pulse counting means for counting said address pulses and for effecting the enabling of an associated response generating means when a preassigned number of address pulses have been counted, the pulse counting means of different monitoring means being responsive to a different number of pulses of the series of address pulses transmitted over said transmission line to provide an enabling signal for an associated response generating means whereby the response signals provided by different ones of the response generating means are transmitted to the control location during different preselected time slots.

7. A system as set forth in claim 6 wherein said pulse generating means includes time slot rate generating means for continuously generating clock pulses at a predetermined rate, power amplifier means, gating means operable when enabled to extend clock pulses to said power amplifier means to enable said power amplifier means to provide power address pulses, said enabling means being responsive to said clock pulses for enabling said gating means to pass a preselected number of said clock pulses to said power amplifier means to define the number of address pulses and therefore the number of time slots that are provided.

8. A system as set forth in claim 7 wherein said power amplifier means comprises operational transconductance amplifier means having an input connected to the output of said gating means to receive said clock pulses and capacitor means connected to an output of said operational amplifier means, said operational amplifier means being responsive to each clock pulse extended thereto to provide output current for causing said capacitor means to charge at a linear rate and to discharge at a non-linear rate to thereby provide current pulses having different rise and fall times.

9. A system as set forth in claim 6 wherein said address pulse generator means transmits a number of address pulses sufficient to define a separate time slot for each monitoring means and a further time slot.

10. A system as set forth in claim 9 wherein said control means includes transmission line continuity test means including means enabled during said further time slot to test the continuity of said transmission line during said further time slot.

11. A system as set forth in claim 9 wherein each of said monitoring means are normally unpowered, each said monitoring means including power circuit means responsive to a first one of the address pulses to provide an energizing signal for the corresponding pulse counting means to enable said pulse counting means to count further address pulses, and gating means, enabled by said pulse counting means after a preselected number of address pulses have been counted, to extend said energizing signal to the corresponding response generating means to enable the response generating means to provide a response signal during a preassigned one of the time slots.

12. In a communication system for reporting information from a plurality of remote locations to a control location, a plurality of monitoring means including a separate monitoring means at each of said remote locations operable to provide an information signal representing the condition of at least one variable monitored by said monitoring means for transmission to said control location, control means at said control location for providing a synchronizing signal for transmission to said remote locations for synchronizing the operation of all of said monitoring means, and transmission line means connecting said monitoring means and said control means in a continuous loop enabling bidirectional transmission between said control means and said monitoring means over first and second paths.

13. In a communication system for reporting information including normal and off-normal conditions for a plurality of variables from a plurality of remote locations to a control location over a common transmission line, a plurality of monitoring means, each connected to said transmission line at a different one of said locations, control means connected to said transmission line at said control location including time slot rate generating means for continuously generating clock pulses at a predetermined rate, power amplifier means, gating means operable when enabled to extend clock pulses to said power amplifier means to enable said power amplifier means to provide power address pulses and enabling means responsive to said clock pulses for enabling said gating means to pass a preselected number of said clock pulses to said power amplifier means to provide a separate address pulse for each of said monitoring means, the end of each address pulse defining the start of a response time slot for one of said monitoring means and the number of said address pulses defining the number of time slots, each of said monitoring means including initiating means having a plurality of condition sensing means each of which indicates a normal or off-normal condition for a different one of a plurality of variables, response generating means including means operable when enabled to normally provide a response signal at a first frequency indicative of a normal condition for all of said variables, said response signal generating means being selectively controllable by said initiating means in the event of an off-normal condition for one or more of said variables to generate a response signal at a different frequency, means for coupling the response signal to said transmission line for transmission to said control location, and pulse counting means for counting said address pulses and for effecting the enabling of an associated response generating means when a predetermined number of said address pulses have been counted, the pulse counting means of different monitoring means being responsive to a different number of address pulses to provide an enabling signal for an associated response generating means whereby the response signals provided by different ones of said response generating means are transmitted to said control location during a different preassigned time slot.

14. In a communication system for reporting information from a plurality of remote locations to a control location, including a communication channel for carrying periodically receiving synchronizing pulses, the end of each synchronizing pulse defining a time slot and the number of synchronizing pulses defining the number of time slots, detecting means for detecting said synchronizing pulses and for providing a control output for each synchronizing pulse detected, comprising first monostable circuit means enabled by each synchronizing pulse to provide an output signal for approximately the duration of the synchronizing pulse and the time slot defined by the synchronizing pulse, and second monostable circuit means enabled by the output signal provided by said first monostable circuit means to provide said control signal.

15. In a communication system for reporting information from a plurality of remote locations to a control location over a common transmission loop, monitoring means at each of said remote locations operable to provide an information signal representing the condition of at least one variable monitored by said monitoring means, control means at said control location including synchronizing means including means for generating a plurality of synchronizing pulses for transmission over said common loop for controlling the operation of all of said monitoring means, the end of each of said synchronizing pulses defining the start of a time slot and a number of said synchronizing pulses defining the number of time slots, and means for preselecting the number of synchronizing pulses to define a separate time slot for each of said monitoring means and at least one further time slot which is assigned to said control means, and at least one area control means connected in an area loop with certain ones of said monitoring means, said area control means also being connected in said common loop to receive said synchronizing signal and to responsively provide a further synchronizing signal for associated monitoring means to effect the generation of information signals by the associated monitoring means and for relaying information signals provided by associated monitoring means to said common loop for transmission over said common loop to said control location.

16. A system as set forth in claim 15 wherein said area control means includes area synchronizing means for generating a further plurality of synchronizing pulses which comprise said further synchronizing signal for defining a predetermined number of time slots including a separate time slot for each of the monitoring means connected to said area loop and a time slot assigned to said area control means.

17. A system as set forth in claim 16 wherein each of said monitoring means connected to said area loop includes means responsive to a different one of said further synchronizing pulses to provide an information signal during an assigned time slot.

18. A system as set forth in claim 15 wherein said area control means includes pulse counting means operable to count out a group of the synchronizing pulses transmitted over said common line and means controlled by said pulse counting means to provide a plurality of synchronizing pulses corresponding in number to the synchronizing pulses of said group for transmission over said area loop to effect the generation of information signals by the monitoring means connected thereto.

19. A system as set forth in claim 16 wherein said area synchronizing means includes pulse counting means for counting the synchronizing pulses transmitted over said common loop, pulse generating means operable when enabled to generate further synchronizing pulses for transmission over said area loop to enable the monitoring means connected thereto, and enabling means controlled by said pulse counting means to enable said pulse generating means when a first preselected number of said synchronizing pulses have been counted and for disabling said pulse generating means after a further preselected number of synchronizing pulses have been counted.

20. A system as set forth in claim 19 wherein said pulse counting means includes pulse detecting means connected to said common loop for detecting said synchronizing pulses and providing a control signal for each synchronizing pulse detected, and counter means for counting the number of control signals provided by said pulse detecting means.

21. A system as set forth in claim 20 wherein said pulse detecting means includes first monostable circuit means enabled by each synchronizing pulse to provide an output signal of a preselected duration and second monostable circuit means enabled by the output signal provided by said first monostable circuit means to provide said control signal.

22. A system as set forth in claim 20 wherein said pulse detecting means includes first monostable circuit means enabled by each synchronizing pulse to provide an output signal for approximately the duration of the synchronizing pulse and the time slot defined by the synchronizing pulse, and second monostable circuit means enabled by the output signal provided by said first monostable circuit means to provide said control signal.

23. A system as set forth in claim 17 wherein said area synchronizing means includes continuity testing means enabled during the time slot assigned to said area control means to test the continuity of said area loop.

24. A system as set forth in claim 23 wherein said area control means includes response generating means enabled by said continuity testing means to provide an information signal during the time slot assigned to said area control means whenever said area loop is continuous.

25. A system as set forth in claim 24 wherein said area control means further includes amplifier means for extending the information signals provided by said response generating means and by the monitoring means connected to said area loop to said common loop for transmission over said common loop to said control location.

26. A system as set forth in claim 24 wherein said continuity testing means includes means for inhibiting said response generating means whenever said area loop is discontinuous to thereby prevent the generation of said response signal during the time slot assigned to said area control means.

27. A system as set forth in claim 21 including a plurality of area control means each connected in said common loop and each being connected in a separate area loop with a different group of said monitoring means, different area control means being operable to control the operation of the associated group of monitoring means at different times.

28. In a communication system for reporting information from a plurality of remote locations to a control location over a common communication channel, monitoring means at each of said remote locations operable when enabled to provide an information signal representing the condition of at least one variable monitored by said monitoring means, at least one area control means connected in an area loop with at least one of said monitoring means and operable when enabled to generate a synchronizing signal for enabling said one monitoring means, at least one local control means connected in a local loop with said area control means and operable when enabled to generate a further synchronizing signal for controlling the operation of said area control means, said local control means also being connected to said common communication channel, and master control means for generating a master synchronizing signal for transmission over said communication channel to enable said local control means.

29. A system as set forth in claim 28 wherein each of said monitoring means is enabled to provide said information signal during a different preassigned time slot, said master control means including time slot rate generating means for providing a master synchronization signal at a predetermined frequency, said local control means being responsive to said master synchronizing signal to generate said further synchronizing signal which defines a plurality of time slots, said area control means being enabled during certain ones of said plurality of time slots to provide said synchronizing signal for enabling at least said one monitoring means.

30. A system as set forth in claim 29 wherein said area control means includes means responsive to said further synchronizing signal to generate a plurality of synchronizing pulses for transmission over said area loop during said certain ones of said time slots, each of said synchronizing pulses defining a separate time slot, different ones of said monitoring means being enabled during a different one of said time slots to provide an information signal.

31. In a communication system for reporting information from a plurality of remote locations to a control location over a common transmission line, a normally unpowered monitoring means at each of said remote monitoring locations, each of said monitoring means including power circuit means, pulse counting means and response generating means operable when energized to provide a response signal representing the condition of at least one variable monitored by said monitoring means for transmission over said transmission line to said control location, and control means at said control location for generating a plurality of address pulses for transmission over said transmission line to the remote locations for supplying power to each of said monitoring means and for effecting sequential readout of the monitoring means, the end of each address pulse defining the start of a time slot and the number of address pulses defining the number of time slots, the power circuit means of each monitoring means being responsive to a first one of said address pulses to provide an energizing signal for enabling said pulse counting means to count further ones of said address pulses, the pulse counting means of different ones of said monitoring means being responsive to a different number of address pulses to extend said energizing signal to an associated response signal generating means to enable a response signal to be provided whereby response signals are provided by different ones of said monitoring means during a different preassigned time slot.

32. In a communication system for reporting information, including normal and off-normal conditions for a plurality of variables, from at least one remote location to a control location over a communication channel, monitoring means at said remote location including initiating means having a plurality of condition sensing means each of which indicates a normal or an off-normal condition for a different one of the variables, and response generating means operable when energized to normally generate a response signal at a first frequency indicative of a normal condition for all of the variables, said response generating means being selectively controllable by said initiating means in the event of an off-normal condition for one or more of the variables to generate a response signal at a different frequency, and means for coupling the response signal to said communication channel for transmission to said control location.

33. A system as set forth in claim 32 including control means at said control location for generating an enabling signal for transmission over said communication channel to said monitoring means at said remote location to effect energization of said response generating means.

34. A system as set forth in claim 33 wherein said monitoring means is normally unpowered, said monitoring means further including power circuit means responsive to said enabling signal for deriving a power signal from said enabling signal and means for extending said power signal to said response generating means for energizing said response generating means to provide a response signal.

35. A system as set forth in claim 32 wherein said response generating means includes priority means for assigning priorities to each of the variables to permit the condition of the highest priority variable to be transmitted to the control location whenever more than one variable is off-normal simultaneously.

36. A system as set forth in claim 35 wherein said initiating means includes first condition sensing means, second condition sensing means and third condition sensing means, said response generating means including priority means for assigning priorities to said first, second and third sensing means to permit an indication of an off-normal condition for said first condition sensing means to be transmitted prior to off-normal conditions for said second or third condition sensing means whenever an off-normal condition is indicated by more than one of said condition sensing means.

37. A system as set forth in claim 35 wherein said response generating means includes multifrequency signal generating means selectively operable to generate a response signal at one of a plurality of frequencies including said first frequency and a plurality of further frequencies which include a different frequency for each of the monitored variables.

38. A system as set forth in claim 37 wherein said initiating means includes a plurality of conductor means for connecting said condition indicating means to said response generating means, said response generating means further including means enabled whenever one of said conductor means is discontinuous to inhibit the operation of said signal generating means.

39. A system as set forth in claim 37 wherein said control means includes receiver means for receiving the response signal provided by said monitoring means, said receiver means including a plurality of frequency detecting means having a separate frequency detecting means for each frequency provided by said response signal generating means, each frequency detecting means being normally operable to provide a first output signal, and enabled to provide a second output signal whenever a response signal at the corresponding frequency is received by said receiver means and exclusivity circuit means controlled by the output signals provided by all of said frequency detecting means to provide an error signal whenever two or more of said frequency detecting means provide said second output signal simultaneously.

40. A system as set forth in claim 39 wherein said receiver means includes strobe pulse generating means enabled by said enabling signal to provide at least one strobe signal for permitting the outputs of said frequency detecting means to be extended to said exclusivity circuit means at a predetermined time relative to the termination of said enabling signal.

41. A system as set forth in claim 40 wherein said exclusivity circuit means is enabled by said strobe signal to provide an error signal whenever at least one of said frequency detecting circuits fails to provide a second output signal at the time a second strobe signal is provided.

42. In a communication system for reporting information from a plurality of remote locations to a control location over a common communication channel, monitoring means at each remote location for monitoring the condition of a plurality of variables, said monitoring means including response signal generating means selectivity operable when enabled to generate a response signal at one of a plurality of frequencies, a first one of said frequencies representing a normal condition for all of said variables and different ones of said other frequencies representing an off-normal condition for different ones of said variables, control means at said control location including receiver means and synchronizing means for generating a synchronizing signal for transmission over said communication channel to said remote locations to enable the response generating means of different ones of said monitoring means to provide a response signal for transmission over said common communication channel to said receiver means at said control location.

43. A system as set forth in claim 42 wherein said synchronizing means includes means for generating a plurality of synchronizing pulses which comprise said synchronizing signal, the end of each of said synchronizing pulses defining the start of a time slot, and the number of said synchronizing pulses defining the number of time slots, different ones of said response generating means being enabled to provide a response signal during a different preassigned one of said time slots.

44. A system as set forth in claim 42 wherein said receiver means includes a plurality of detecting means, including a separate frequency detector means corresponding to each one of said plurality of frequencies, said frequency detector means being selectively enabled in accordance with the frequency of the response signal provided by a given one of said monitoring means to provide an output signal indicating the condition of the variables monitored by said one monitoring means.

45. A system as set forth in claim 44 wherein each said frequency detector means comprises a phase locked synchronous detector means.

46. A system as set forth in claim 44 wherein said receiver means includes exclusivity logic circuit means including signal output means and signal processing means for extending the output signals provided by said frequency detector means to said signal output means, said signal output means being operable when enabled to provide an output signal representing the conditions of the monitored variables for a given one of said monitoring means only after an output signal has been provided by one of said frequency detector means for a predetermined time during the time slot assigned to such monitoring means.

47. A system as set forth in claim 46 wherein said receiver means includes strobe signal generating means enabled by the one of the synchronizing pulses which defines the time slot for said one monitoring means to provide at least one strobe signal for enabling said signal output means at a predetermined time during the time slot for said one monitoring means.

48. A system as set forth in claim 47 wherein said strobe signal generating means includes first monostable circuit means enabled by said one synchronizing pulse to provide a control output for a predetermined duration, and second monostable circuit means responsive to said control output to provide said strobe signal at said predetermined time.

49. A system as set forth in claim 47 wherein said exclusivity logic circuit means further includes inhibit means controlled by the output signals provided by said frequency detector means to provide an error output signal over said signal output means whenever at least one of said frequency detector means fails to provide an output signal during said predetermined time.

50. A system as set forth in claim 49 wherein said receiver means further includes error counting means for providing an error indication only after a predetermined number of error output signals have been provided by said inhibit means.

51. A system as set forth in claim 49 wherein said synchronizing means is continuously operable to generate said plurality of synchronizing pulses to provide repetitive scans of said monitoring means and wherein said error counting means includes accumulating means for accumulating a count of error output signals provided during successive scans.

52. A system as set forth in claim 51 wherein said receiver means includes scan reset means operable to reset said accmulating means whenever said inhibit means fails to provide an error output signal during a given scan.

53. A system as set forth in claim 43 wherein the condition of the variables monitored by each monitoring means is represented by a single frequency which is provided during the preassigned time slot, and wherein a change of state of a given variable is indicated by a change from one frequency of said plurality of frequencies to another frequency of said plurality of frequencies.

54. A current pulse generator responsive to low level signals to provide high power current pulses comprising operational transconductance amplifier means having a first input connected to a source of low level signals, a second input connected to a point of reference potential, and capacitor means connected to an output of said amplifier means, said amplifier means being responsive to each low level signal extended thereto to provide output current for causing said capacitor means to charge at a first rate and to discharge at a second rate to thereby provide a high power current pulse having different rise and fall times.

55. A current pulse generator as set forth in claim 54 which includes means for supplying control current to said amplifier means for controlling the charge and discharge rate of said capacitor means to provide a high power current pulse having a substantially linear rise time and a non-linear fall time.

56. A current pulse generator responsive to low level signals to provide high power current pulses comprising operational transconductance amplifier means having a first input connected to a source of low level signals, a second input connected to a point of reference potential, capacitor means connected to an output of said amplifier means, bias means connected to a bias input of said amplifier means to supply current to said amplifier means for establishing an output current level for said amplifier means, said amplifier means being responsive to each low level signal extended to said first input to provide output current for effecting charging and discharging of said capacitor means, and control means connected to a control input of said amplifier means to supply further current to said amplifier means to cause said capacitor means to charge at a first rate and to discharge at a second rate to provide a current pulse having different rise and fall times.

57. A current pulse generator as set forth in claim 56 wherein said control means causes said capacitor means to charge at a substantially linear rate and to discharge at a non-linear rate.

* * * * *